US012638762B2

(12) United States Patent (10) Patent No.: US 12,638,762 B2
Iwama et al. (45) Date of Patent: May 26, 2026

(54) LIGHT SOURCE DEVICE AND PROJECTOR

(71) Applicant: SEIKO EPSON CORPORATION,
Tokyo (JP)

(72) Inventors: Yuichiro Iwama, Azumino (JP);
Takumi Nagai, Shimonita-machi (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 292 days.

(21) Appl. No.: 18/606,046

(22) Filed: Mar. 15, 2024

(65) Prior Publication Data

US 2024/0310712 A1 Sep. 19, 2024

(30) Foreign Application Priority Data

Mar. 17, 2023 (JP) ................................. 2023-043472

(51) Int. Cl.
*G03B 21/20* (2006.01)
(52) U.S. Cl.
CPC .................................. *G03B 21/208* (2013.01)
(58) Field of Classification Search
CPC .... G03B 21/006; G03B 21/20; G03B 21/202;
G03B 21/204; G03B 21/2053; G03B
21/208; H04N 9/315
See application file for complete search history.

(56) References Cited

U.S. PATENT DOCUMENTS

| | | | | | |
|---|---|---|---|---|---|
| 7,068,789 | B2 * | 6/2006 | Huitema | ............. | H04L 63/1458 |
| | | | | | 713/168 |
| 7,614,069 | B2 * | 11/2009 | Stone | ............... | H04N 21/25435 |
| | | | | | 725/89 |
| 7,650,624 | B2 * | 1/2010 | Barsoum | ................ | H04N 7/081 |
| | | | | | 725/23 |
| 7,721,313 | B2 * | 5/2010 | Barrett | ............... | H04N 21/4334 |
| | | | | | 725/89 |
| 7,813,822 | B1 * | 10/2010 | Hoffberg | ................ | H04N 7/163 |
| | | | | | 381/73.1 |
| 8,032,911 | B2 * | 10/2011 | Ohkita | ................ | H04L 61/5038 |
| | | | | | 725/74 |
| 8,121,706 | B2 * | 2/2012 | Morikawa | ........... | H04L 12/2814 |
| | | | | | 725/74 |
| 8,949,923 | B2 * | 2/2015 | Muvavarirwa | .... | H04N 21/4108 |
| | | | | | 370/332 |
| 10,197,971 | B1 * | 2/2019 | Horst | ................... | G11C 13/044 |

(Continued)

FOREIGN PATENT DOCUMENTS

WO WO 2020/078790 A1 4/2020
WO WO 2020/254455 A 12/2020

*Primary Examiner* — Michael B. Pierorazio
(74) *Attorney, Agent, or Firm* — Dority & Manning, P.A.

(57) ABSTRACT
A light source device of the present disclosure includes a
light emitting element, a light guide member, a supporting
member, and a pressing member. The pressing member has
a first extension portion extending in a direction closer to a
direction along a third axis than a direction along a first axis,
and contacting a third face, a pair of second extension
portions extending in a direction closer to a direction along
the first axis than a direction along the third axis, and having
one ends coupled to the first extension portion and the other
ends fixed to the supporting member, and elastically deforms
in a direction crossing a principal surface of the supporting
surface to urge the third face.

12 Claims, 7 Drawing Sheets

(56)                    References Cited

U.S. PATENT DOCUMENTS

| | | | | |
|---|---|---|---|---|
| 2003/0056093 A1* | 3/2003 | Huitema | H04L 67/104 | |
| | | | 713/156 | |
| 2004/0117856 A1* | 6/2004 | Barsoum | G06Q 30/0207 | |
| | | | 348/E7.071 | |
| 2004/0156212 A1 | 8/2004 | Kamijima | | |
| 2004/0246448 A1* | 12/2004 | Ogawa | H04N 9/315 | |
| | | | 348/E9.027 | |
| 2005/0216942 A1* | 9/2005 | Barton | H04N 21/6125 | |
| | | | 348/E7.071 | |
| 2005/0283815 A1* | 12/2005 | Brooks | H04H 20/78 | |
| | | | 725/127 | |
| 2005/0289632 A1* | 12/2005 | Brooks | H04N 7/17309 | |
| | | | 725/127 | |
| 2006/0008228 A1 | 1/2006 | Kitamura et al. | | |
| 2006/0010481 A1* | 1/2006 | Wall | H04N 7/163 | |
| | | | 725/151 | |
| 2006/0212197 A1* | 9/2006 | Butler | B60R 11/0235 | |
| | | | 701/1 | |
| 2006/0225105 A1* | 10/2006 | Russ | H04N 7/17318 | |
| | | | 348/E7.071 | |
| 2007/0050822 A1* | 3/2007 | Stevens | H04N 7/14 | |
| | | | 725/74 | |
| 2007/0079341 A1* | 4/2007 | Russ | H04N 21/43615 | |
| | | | 725/89 | |
| 2007/0101185 A1* | 5/2007 | Ostrowka | H04N 21/4334 | |
| | | | 714/6.13 | |
| 2007/0130601 A1* | 6/2007 | Li | H04N 21/6405 | |
| | | | 725/112 | |
| 2007/0157281 A1* | 7/2007 | Ellis | H04N 21/4147 | |
| | | | 725/74 | |
| 2007/0216871 A1 | 9/2007 | Yoshikawa et al. | | |
| 2008/0013919 A1* | 1/2008 | Boston | G11B 19/00 | |
| 2008/0022330 A1* | 1/2008 | Barrett | H04N 21/8352 | |
| | | | 725/89 | |
| 2008/0022331 A1* | 1/2008 | Barrett | H04N 21/6125 | |
| | | | 725/89 | |
| 2008/0022332 A1* | 1/2008 | Barrett | H04N 21/4227 | |
| | | | 725/89 | |
| 2008/0155615 A1* | 6/2008 | Craner | H04N 7/17318 | |
| | | | 348/E7.071 | |
| 2008/0221734 A1* | 9/2008 | Nagao | G06V 10/56 | |
| | | | 706/20 | |
| 2008/0235587 A1* | 9/2008 | Heie | H04N 7/142 | |
| | | | 709/231 | |
| 2008/0235733 A1* | 9/2008 | Heie | H04N 21/482 | |
| | | | 725/46 | |
| 2009/0162032 A1* | 6/2009 | Patel | H04N 21/8355 | |
| | | | 386/353 | |
| 2010/0107186 A1* | 4/2010 | Varriale | H04H 60/23 | |
| | | | 455/410 | |
| 2010/0125876 A1* | 5/2010 | Craner | H04N 21/4331 | |
| | | | 725/37 | |
| 2010/0263013 A1* | 10/2010 | Asakura | H04N 21/443 | |
| | | | 725/116 | |
| 2010/0296487 A1* | 11/2010 | Karaoguz | H04W 36/04 | |
| | | | 370/332 | |
| 2010/0313225 A1* | 12/2010 | Cholas | H04N 21/4402 | |
| | | | 725/62 | |
| 2010/0313226 A1* | 12/2010 | Cholas | H04N 21/25875 | |
| | | | 725/98 | |
| 2011/0066744 A1* | 3/2011 | Del Sordo | H04N 21/4305 | |
| | | | 709/231 | |
| 2011/0086619 A1* | 4/2011 | George | H04M 1/72415 | |
| | | | 455/414.1 | |
| 2011/0103374 A1* | 5/2011 | Lajoie | H04L 65/612 | |
| | | | 370/352 | |
| 2011/0107364 A1* | 5/2011 | Lajoie | H04L 65/1023 | |
| | | | 370/352 | |
| 2011/0107379 A1* | 5/2011 | Lajoie | H04L 65/611 | |
| | | | 725/151 | |
| 2011/0109819 A1 | 5/2011 | Nishihata | | |
| 2011/0191810 A1* | 8/2011 | Thomas | H04N 7/106 | |
| | | | 725/78 | |
| 2012/0230649 A1* | 9/2012 | Craner | H04N 21/4532 | |
| | | | 386/230 | |
| 2013/0198787 A1* | 8/2013 | Perry, II | H04N 21/2585 | |
| | | | 725/86 | |
| 2017/0109584 A1* | 4/2017 | Yao | H04N 21/4666 | |
| 2017/0254932 A1* | 9/2017 | Huang | G02F 1/21 | |
| 2018/0150704 A1* | 5/2018 | Lee | G06V 10/454 | |
| 2019/0108618 A1* | 4/2019 | Hwang | G06T 3/4046 | |
| 2019/0222891 A1* | 7/2019 | Shen | H04N 21/25875 | |
| 2020/0196024 A1* | 6/2020 | Hwang | G06N 3/044 | |
| 2020/0211229 A1* | 7/2020 | Hwang | G06T 3/06 | |
| 2021/0326690 A1* | 10/2021 | Pégard | G06V 10/88 | |
| 2022/0342137 A1 | 10/2022 | Yu et al. | | |
| 2023/0043791 A1* | 2/2023 | Supikov | G03H 1/0866 | |
| 2023/0205133 A1* | 6/2023 | Matusik | G03H 1/04 | |
| | | | 359/9 | |
| 2023/0368012 A1* | 11/2023 | Yu | G02B 5/18 | |
| 2024/0126156 A1* | 4/2024 | Iwama | G03B 21/145 | |

* cited by examiner

LIGHT SOURCE DEVICE AND PROJECTOR

The present application is based on, and claims priority from JP Application Serial Number 2023-043472, filed Mar. 17, 2023, the disclosure of which is hereby incorporated by reference herein in its entirety.

BACKGROUND

1. Technical Field

The present disclosure relates to a light source device and a projector.

2. Related Art

As a light source device used for a projector, a light source device using fluorescence emitted from a phosphor by irradiation of the phosphor with an excitation light output from a light emitting element is proposed.

International Publication 2020/254455 discloses a light source device including an excitation light source outputting an excitation light, a phosphor rod converting the excitation light into fluorescence, and a heat transfer member releasing heat generated in the phosphor rod, wherein the phosphor rod is placed in a groove portion of the heat transfer member. In the light source device, the phosphor rod is pressed by a spring attached to a support and held in the groove portion of the heat transfer member.

In the light source device of International Publication 2020/254455, the heat transfer member functions as a heat dissipation member suppressing a temperature rise of the phosphor rod and it is desirable that the phosphor rod is pressed against the heat transfer member by an appropriate force. In International Publication 2020/254455, only a part projecting from the support of the spring pressing the phosphor rod is elastically deformable, and there is a problem that the pressing force for the phosphor rod easily varies due to a dimension error of the pressing spring or the like.

For example, when the pressing force for the phosphor rod is smaller than a predetermined value, heat of the phosphor rod is not sufficiently transmitted to the heat transfer member, and thereby, the temperature of the phosphor rod may rise and fluorescence having desired intensity may not be obtained. On the other hand, when the pressing force for the phosphor rod is larger than the predetermined value, an excessively large load may be applied to the phosphor rod and the phosphor rod may be broken according to circumstances.

As above, the light source device with wavelength conversion is taken as an example, however, even in a light source device without wavelength conversion, a highly reliable light source device by which an output light having desired intensity is obtained is desired.

SUMMARY

In order to solve the above described problem, a light source device according to an aspect of the present disclosure includes a light emitting element outputting a light, a light guide member entered by the light output from the light emitting element, a supporting member supporting the light guide member in a groove portion, and a pressing member pressing the light guide member against the supporting member, wherein the light guide member has a first face and a second face located at sides opposite to each other on a first axis of the light guide member, a third face and a fourth face located at sides opposite to each other on a second axis crossing the first axis, and a fifth face and a sixth face located at sides opposite to each other on a third axis crossing the first axis and the second axis, the first face of the light guide member outputs a light guided through the light guide member, the light emitting element is provided to face the third face, the groove portion has a supporting surface facing the fourth face, and the pressing member has a first extension portion extending in a direction closer to a direction along the third axis than a direction along the first axis, and contacting the third face, a pair of second extension portions extending in a direction closer to a direction along the first axis than a direction along the third axis, and having one ends coupled to the first extension portion and the other ends fixed to the supporting member, and elastically deforms in a direction crossing a principal surface of the supporting surface to urge the third face.

A projector according to an aspect of the present disclosure includes the light source device according to the aspect of the present disclosure, a light modulation device modulating a light output from the light source device according to image information, and a projection optical device projecting the light modulated by the light modulation device.

DESCRIPTION OF EMBODIMENTS

As below, one embodiment of the present disclosure will be explained.

A projector of the embodiment is an example of a projector using a liquid crystal panel as a light modulation device.

In the following respective drawings, for clearly showing the respective component elements, scales of dimensions may be made different depending on the component elements.

Figure 1:
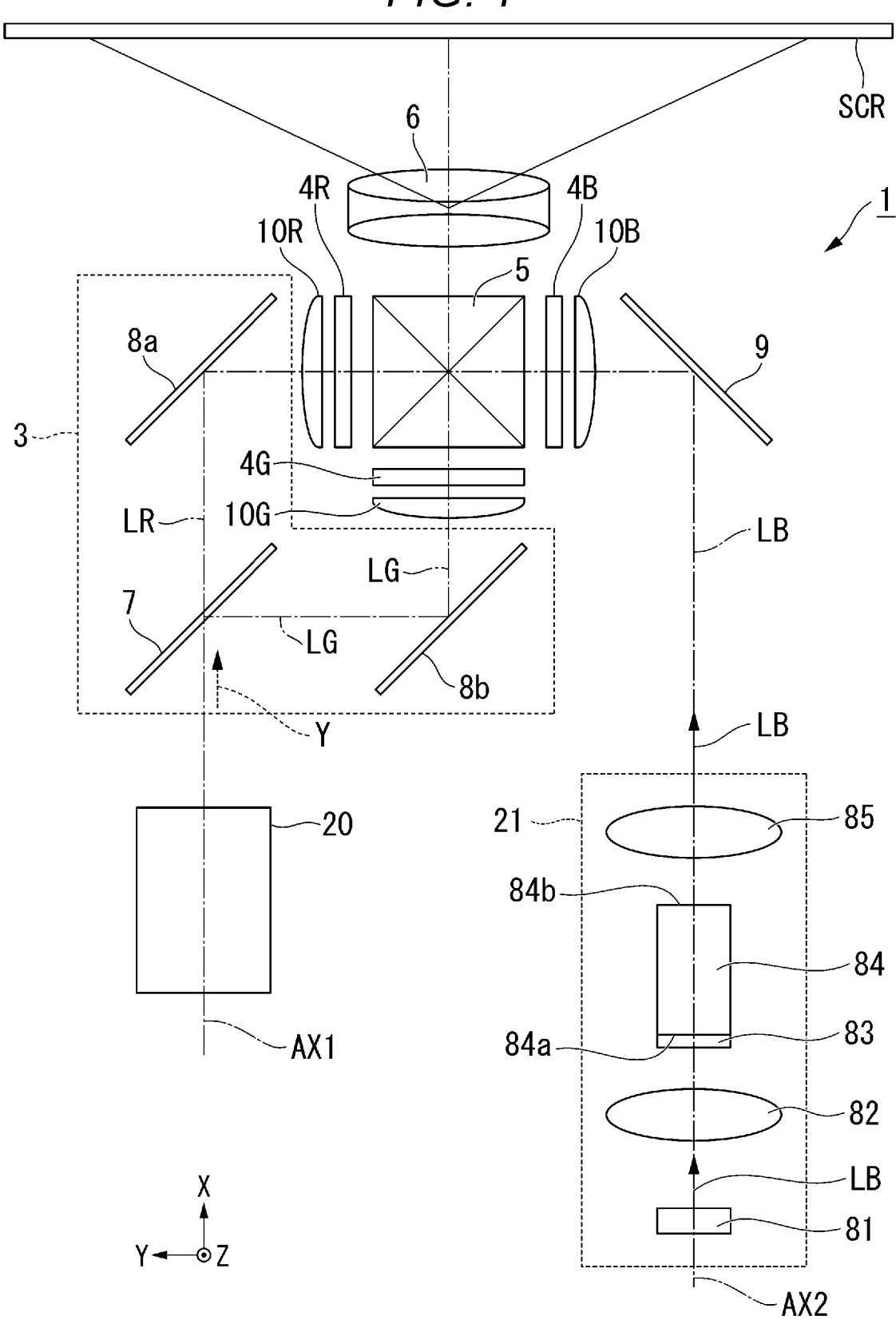
FIG. 1 shows a schematic configuration of a projector 1 of one embodiment.

FIG. 1 shows a schematic configuration of a projector 1 of the embodiment.

As shown in FIG. 1, the projector 1 of the embodiment is a projection image display apparatus displaying a color image on a screen SCR as a projected surface. The projector 1 includes three light modulation devices corresponding to respective color lights of a red light LR, a green light LG, and a blue light LB.

The projector 1 includes a first illumination device 20, a second illumination device 21, a color separation system 3, a light modulation device 4R, a light modulation device 4G, a light modulation device 4B, a light combining element 5, and a projection optical device 6.

The first illumination device 20 outputs yellow fluorescence Y toward the color separation system 3. The second illumination device 21 outputs the blue light LB toward the t light modulation device 4B. The detailed configurations of the first illumination device 20 and the second illumination device 21 will be described later.

As below, in the drawings, the explanation will be made using an XYZ orthogonal coordinate system as necessary. A Z-axis is an axis along upward and downward directions of the projector 1. An X-axis is an axis parallel to an optical axis AX1 of the first illumination device 20 and an optical axis AX2 of the second illumination device 21. A Y-axis is an axis orthogonal to the X-axis and the Z-axis. The optical axis AX1 of the first illumination device 20 is a center axis of the fluorescence Y output from the first illumination device 20. The optical axis AX2 of the second illumination device 21 is a center axis of the blue light LB output from the second illumination device 21. One direction of directions along the X-axis is referred to as "+X direction" and the opposite direction thereto is referred to as "−X direction", one direction of directions along the Y-axis is referred to as "+Y direction" and the opposite direction thereto is referred to as "−Y direction", and one direction of directions along the Z-axis is referred to as "+Z direction" and the opposite direction thereto is referred to as "−Z direction". Further, when the two directions along the X-axis are not distinguished, the directions are referred to as "X-axis directions", when the two directions along the Y-axis are not distinguished, the directions are referred to as "Y-axis directions", and, when the two directions along the Z-axis are not distinguished, the directions are referred to as "Z-axis directions".

The color separation system 3 separates the yellow fluorescence Y output from the first illumination device 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is placed in an optical path of the green light LG. The second reflection mirror 8b reflects the green light LG reflected by the dichroic mirror 7 toward the light modulation device 4G. The first reflection mirror 8a is placed in an optical path of the red light LR. The first reflection mirror 8a reflects the red light LR transmitted through the dichroic mirror 7 toward the light modulation device 4R.

On the other hand, the blue light LB output from the second illumination device 21 is reflected toward the light modulation device 4B by a reflection mirror 9.

As below, a configuration of the second illumination device 21 will be explained.

The second illumination device 21 includes a light source unit 81, a collector lens 82, a diffuser plate 83, a rod lens 84, and a relay lens 85. The light source unit 81 includes at least one semiconductor laser. The light source unit 81 outputs the blue light LB as a laser beam. Note that the light source unit 81 is not limited to the semiconductor laser, but may be formed using an LED emitting a blue light.

The collector lens 82 includes a convex lens. The collector lens 82 substantially collects and enters the blue light LB output from the light source unit 81 into the diffuser plate 83. The diffuser plate 83 diffuses the blue light LB output from the collector lens 82 at predetermined diffusivity and generates the blue light LB having a substantially uniform intensity distribution like that of the fluorescence Y output from the first illumination device 20. As the diffuser plate 83, e.g., a ground glass formed of an optical glass is used.

The blue light LB diffused by the diffuser plate 83 enters the rod lens 84. The rod lens 84 has a prism shape extending along the optical axis AX2 of the second illumination device 21. The rod lens 84 has a light incident end face 84a provided on one end and a light exiting end face 84b provided on the other end. The diffuser plate 83 is fixed to the light incident end face 84a of the rod lens 84 via an optical adhesive (not shown). It is desirable that a refractive index of the diffuser plate 83 and a refractive index of the rod lens 84 are as equal as possible.

The blue light LB is propagated while being totally reflected inside of the rod lens 84, and output in an illuminance distribution with increased uniformity from the light exiting end face 84b. The blue light LB output from the rod lens 84 enters the relay lens 85. The relay lens 85 enters the blue light LB in the illuminance distribution with the uniformity increased by the rod lens 84 into the reflection mirror 9.

The shape of the light exiting end face 84b of the rod lens 84 is a rectangular shape substantially similar to the shape of an image formation area of the light modulation device 4B. Thereby, the blue light LB output from the rod lens 84 efficiently enters the image formation area of the light modulation device 4B.

The light modulation device 4R modulates the red light LR according to the image information and forms an image light corresponding to the red light LR. The light modulation device 4G modulates the green light LG according to the image information and forms an image light corresponding to the green light LG. The light modulation device 4B modulates the blue light LB according to the image information and forms an image light corresponding to the blue light LB.

For the respective light modulation device 4R, light modulation device 4G, and light modulation device 4B, e.g., transmissive liquid crystal panels are used. At light incident sides and light exiting sides of the liquid crystal panels, polarizers (not shown) are respectively placed. The polarizer transmits only a linearly-polarized light in a specific direction.

At the light incident side of the light modulation device 4R, a field lens 10R is placed. At the light incident side of the light modulation device 4G, a field lens 10G is placed. At the light incident side of the light modulation device 4B, a field lens 10B is placed. The field lens 10R parallelizes a principal ray of the red light LR entering the light modulation device 4R. The field lens 10G parallelizes a principal ray of the green light LG entering the light modulation device 4G. The field lens 10B parallelizes a principal ray of the blue light LB entering the light modulation device 4B.

The light combining element 5 is entered by the image lights output from the light modulation device 4R, the light modulation device 4G, and the light modulation device 4B, combines the image lights corresponding to the red light LR, the green light LG, and the blue light LB, and outputs the combined image light toward the projection optical device 6. For the light combining element 5, e.g., a cross dichroic prism is used.

The projection optical device 6 includes a plurality of projection lenses. The projection optical device 6 enlarges and projects the image light combined by the light combining element 5 toward the screen SCR. Thereby, a color image is displayed on the screen SCR.

Subsequently, a configuration of the first illumination device 20 will be explained.

Figure 2:
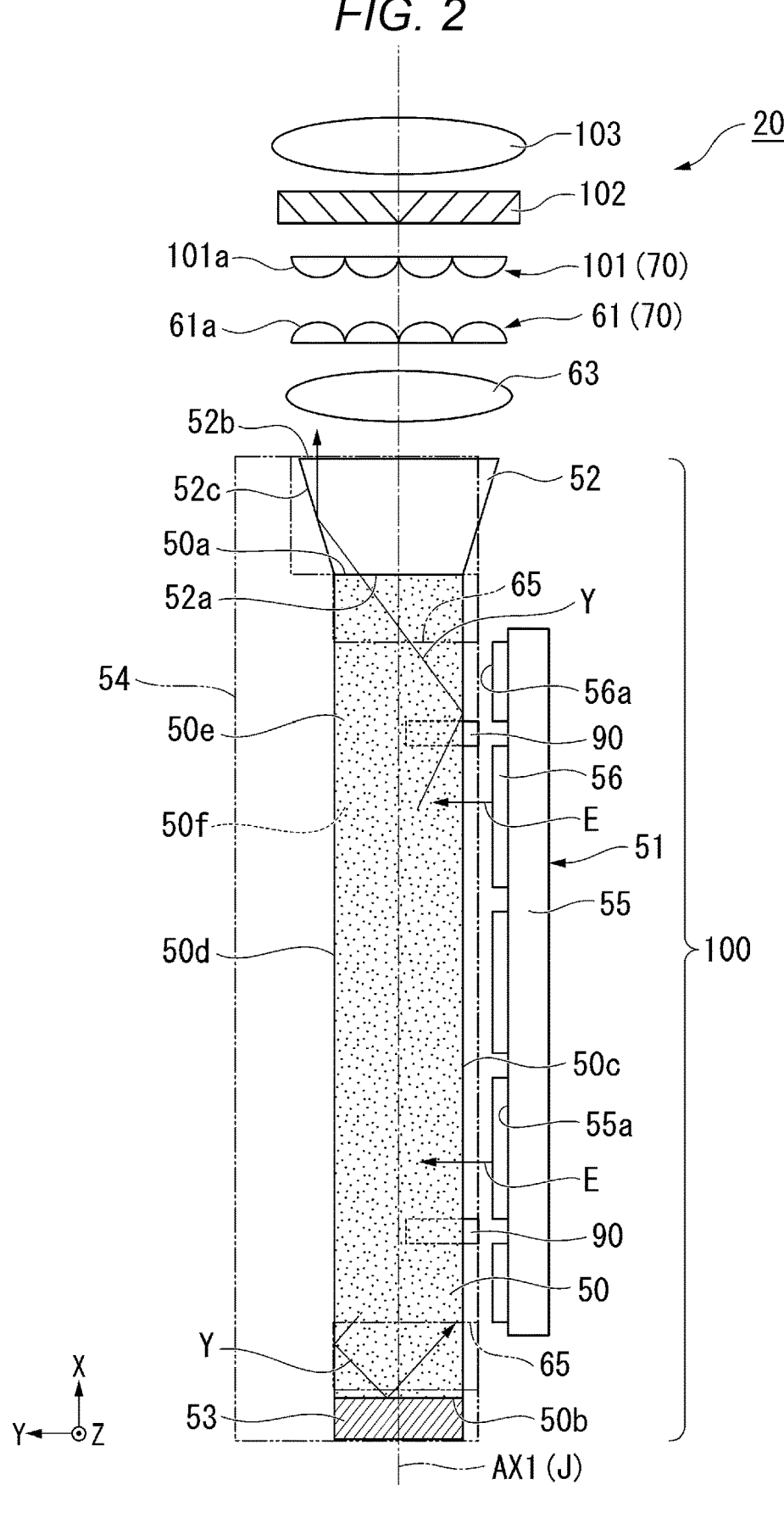
FIG. 2 is a schematic configuration diagram of a first illumination device.

FIG. 2 is a schematic configuration diagram of the first illumination device 20.

As shown in FIG. 2, the first illumination device 20 includes a light source device 100, an optical integration system 70, a polarization conversion element 102, and a superimposition system 103.

The light source device 100 includes a wavelength conversion member 50, a light source unit 51, an angle conversion member 52, a mirror 53, a supporting member 54, holding members 65, and a pair of pressing members 90. The wavelength conversion member 50 of the embodiment corresponds to "light guide member" in What is Claimed is.

The wavelength conversion member 50 has a quadrangular prism shape extending along the X-axis and has six faces. A side extending along the X-axis of the wavelength conversion member 50 is longer than a side extending along the Y-axis and a side extending along the Z-axis. Therefore, the X-axis corresponds to a longitudinal side of the wavelength conversion member 50. A length of the side extending along the Y-axis and a length of the side extending along the Z-axis are equal. That is, the sectional shape of the wavelength conversion member 50 cut along a plane along the YZ-plane perpendicular to the X-axis is square. Note that the sectional shape of the wavelength conversion member 50 cut along the plane along the YZ-plane may be rectangle.

The X-axis of the embodiment corresponds to "first axis" of What is Claimed is. The Y-axis of the embodiment corresponds to "second axis" of What is Claimed is. The Z-axis of the embodiment corresponds to "third axis" of What is Claimed is.

The wavelength conversion member 50 includes a first face 50a and a second face 50b, a third face 50c and a fourth face 50d, and a fifth face 50e and a sixth face 50f. The first face 50a and the second face 50b cross the X-axis along the longitudinal side of the wavelength conversion member 50 and are located at sides opposite to each other on the X-axis. In the embodiment, the first face 50a is located at the +X side as one side in the X-axis direction along the X-axis and the second face 50b is located at the −X side as the other side in the X-axis direction.

The third face 50c and the fourth face 50d cross the first face 50a and the second face 50b, cross the X-axis along the longitudinal side of the wavelength conversion member 50, and, in the case of the embodiment, are located at sides opposite to each other on the Y-axis orthogonal thereto. In the embodiment, the third face 50c is located at the −Y side as one side in the Y-axis direction along the Y-axis and the fourth face 50d is located at the +Y side as the other side in the Y-axis direction.

The fifth face 50e and the sixth face 50f cross the third face 50c and the fourth face 50d, cross the X-axis and the Y-axis, and, in the case of the embodiment, are located at sides opposite to each other on the Z-axis orthogonal thereto. In the embodiment, the fifth face 50e is located in the +Z direction as one side in the Z-axis direction and the sixth face 50f is located in the −Z direction as the other side in the Z-axis direction.

In the following explanation, when the third face 50c, the fourth face 50d, the fifth face 50e, and the sixth face 50f are not distinguished, these may be simply referred to as "side faces 50c, 50d, 50e, 50f".

The wavelength conversion member 50 contains at least a phosphor and converts an excitation light E having a first wavelength range output from a light emitting element 56 of the light source unit 51 into fluorescence Y having a second wavelength range different from the first wavelength range. The excitation light E enters the wavelength conversion member 50 from the third face 50c. The fluorescence Y is guided inside of the wavelength conversion member 50 and output from the first face 50a. The excitation light E of the embodiment corresponds to "first light" in What is Claimed is. The fluorescence Y of the embodiment corresponds to "second light" in What is Claimed is.

The wavelength conversion member 50 contains a ceramic phosphor of a polycrystalline phosphor that wavelength-converts the excitation light E into the fluorescence Y. The second wavelength range of the fluorescence Y is e.g., a yellow wavelength range from 490 nm to 750 nm. That is, the fluorescence Y is yellow fluorescence containing a red light component and a green light component.

The wavelength conversion member 50 may contain a single-crystalline phosphor in place of the polycrystalline phosphor. Or, the wavelength conversion member 50 may include a fluorescent glass. Or, the wavelength conversion member 50 may be formed using a material in which many phosphor particles are dispersed in a binder of glass or resin. The wavelength conversion member 50 including the material converts the excitation light E into the fluorescence Y.

Specifically, the material of the wavelength conversion member 50 includes e.g., an yttrium aluminum garnet (YAG) phosphor. YAG: Ce containing cerium (Ce) as an activator agent is taken as an example. As the material of the wavelength conversion member 50, a material formed by mixing and solid-phase reaction of raw material powder containing elements of $Y_2O_3$, $Al_2O_3$, $CeO_3$, etc., Y—Al—O amorphous particles obtained by a wet process including a coprecipitation process and a sol-gel process, YAG particles obtained by a gas-phase process including a spray drying process, a flame pyrolysis process, and a thermal plasma process, or the like is used.

The light source unit 51 includes a substrate 55 and the light emitting element 56. The light emitting element 56 has a light emitting face 56a outputting the excitation light E in the first wavelength range. The light emitting element 56 includes e.g., a light emitting diode (LED). The light emitting face 56a of the light emitting element 56 faces the third face 50c of the wavelength conversion member 50 and outputs the excitation light E toward the third face 50c. The first wavelength range is e.g., a wavelength range from blue to violet from 400 nm to 480 nm, and the peak wavelength is e.g., 445 nm. As described above, the light source unit 51 is provided to face one side face 50c of the four side faces 50c, 50d, 50e, 50f along the longitudinal direction of the wavelength conversion member 50.

The substrate 55 supports the light emitting element 56. In the case of the embodiment, a plurality of the light emitting elements 56 are provided on one surface 55a of the substrate 55. In the case of the embodiment, the light source unit 51 includes the light emitting elements 56 and the substrate 55, and may additionally include other optical members such as a light guide plate, a diffuser plate, and a lens. Further, in the embodiment, the plurality of light emitting elements 56 are used, however, the number of the light emitting elements 56 is not particularly limited.

The supporting member 54 has a groove portion 154, and supports the wavelength conversion member 50 inside of the groove portion 154 and diffuses and releases heat generated in the wavelength conversion member 50 to the outside. For the purpose, it is desirable that the supporting member 54 is formed using a material having a predetermined strength and higher thermal conductivity. As the material for the supporting member 54, e.g., a metal such as aluminum or stainless is used and, particularly, 6061 aluminum alloy is desirably used. The specific configuration of the supporting member 54 will be described later.

The wavelength conversion member 50 of the embodiment includes a first projecting portion 151 projecting from the groove portion 154 in the +X direction and a second projecting portion 152 projecting from the groove portion 154 in the −X direction.

The holding members 65 hold the first projecting portion 151 or the second projecting portion 152 projecting from the groove portion 154 of the supporting member 54. Accordingly, the wavelength conversion member 50 does not contact the wall surface of the groove portion 154, but partially projects to the outside of the groove portion 154 of the supporting member 54. The holding members 65 hold the parts projecting to the outside of the groove portion 154 in the wavelength conversion member 50. The holding members 65 restrict the position of the wavelength conversion member 50 relative to the supporting member 54 with the pair of pressing members 90.

The mirror 53 is provided on the second face 50*b* of the wavelength conversion member 50. The mirror 53 reflects the fluorescence Y guided inside of the wavelength conversion member 50 and reaching the second face 50*b*. The mirror 53 includes a metal film or a dielectric multilayer film formed on the second face 50*b* of the wavelength conversion member 50.

In the first illumination device 20, when the excitation light E output from the light source unit 51 enters the wavelength conversion member 50, the phosphor contained in the wavelength conversion member 50 is excited and the fluorescence Y is emitted from an arbitrary light emitting point. The fluorescence Y travels in all directions from the arbitrary light emitting point, and the fluorescence Y toward the four side faces 50*c*, 50*d*, 50*e*, 50*f* travels toward the first face 50*a* or the second face 50*b* while being repeatedly totally reflected at a plurality of locations of the side faces 50*c*, 50*d*, 50*e*, 50*f*. The first face 50*a* outputs the fluorescence Y propagated by total reflection and guided within the wavelength conversion member 50. In the case of the embodiment, the fluorescence Y traveling toward the first face 50*a* enters the angle conversion member 52 provided on the first face 50*a*. The fluorescence Y traveling toward the second face 50*b* is reflected by the mirror 53 and travels toward the first face 50*a*.

Of the excitation light E entering the wavelength conversion member 50, a part of the excitation light E not used for the excitation of the phosphor is reflected by the members around the wavelength conversion member 50 including the light emitting element 56 of the light source unit 51 or the mirror 53 provided on the second face 50*b*. Accordingly, the part of the excitation light E is confined inside of the wavelength conversion member 50 and reused.

The angle conversion member 52 is provided at the light exiting side of the first face 50*a* of the wavelength conversion member 50. The angle conversion member 52 includes e.g., a tapered rod. The angle conversion member 52 has a light incident face 52*a* entered by the fluorescence Y output from the wavelength conversion member 50, a light exiting face 52*b* outputting the fluorescence Y, and a side face 52*c* reflecting the entering fluorescence Y toward the light exiting face 52*b*.

The angle conversion member 52 has a truncated rectangular pyramid shape and the sectional area perpendicular to an optical axis J spreads along the traveling direction of the light. Therefore, the area of the light exiting face 52*b* is larger than the area of the light incident face 52*a*. An axis passing through the centers of the light exiting face 52*b* and the light incident face 52*a* and being parallel to the X-axis is the optical axis J of the angle conversion member 52. Note that the optical axis J of the angle conversion member 52 is aligned with the optical axis AX1 of the first illumination device 20.

The fluorescence Y entering the angle conversion member 52 changes the direction to be closer to the direction parallel to the optical axis J at each time when totally reflected by the side face 52*c* while traveling inside of the angle conversion member 52. In this manner, the angle conversion member 52 converts the output angle distribution of the fluorescence Y output from the first face 50*a* of the wavelength conversion member 50. Specifically, the angle conversion member 52 sets the maximum exit angle of the fluorescence Y on the light exiting face 52*b* to be smaller than the maximum incident angle of the fluorescence Y on the light incident face 52*a*.

Generally, etendue of light defined by a product of an area of a light exiting area and a solid angle (maximum exit angle) is preserved, and the etendue of the fluorescence Y is preserved before and after the transmission through the angle conversion member 52. As described above, the angle conversion member 52 has a configuration in which the area of the light exiting face 52*b* is larger than the area of the light incident face 52*a*. Accordingly, in view of the preservation of the etendue, in the angle conversion member 52, the maximum exit angle of the fluorescence Y on the light exiting face 52*b* may be set to be smaller than the maximum incident angle of the fluorescence Y on the light incident face 52*a*.

The angle conversion member 52 is fixed to the wavelength conversion member 50 via an optical adhesive (not shown) so that the light incident face 52*a* faces the first face 50*a* of the wavelength conversion member 50. That is, the angle conversion member 52 and the wavelength conversion member 50 are in contact via the optical adhesive and no air gap (air layer) is provided between the angle conversion member 52 and the wavelength conversion member 50. When an air gap is provided between the angle conversion member 52 and the wavelength conversion member 50, of the fluorescence Y reaching the light incident face 52*a* of the angle conversion member 52, the fluorescence Y entering the light incident face 52*a* at an angle equal to or larger than a critical angle is totally reflected by the light incident face 52*a* and does not enter the angle conversion member 52. On the other hand, when no air gap is provided between the angle conversion member 52 and the wavelength conversion member 50 as in the embodiment, a loss component of the fluorescence Y not entering the angle conversion member 52 by the total reflection may be reduced. In the viewpoint, it is desirable that the refractive index of the angle conversion member 52 and the refractive index of the wavelength conversion member 50 are as equal as possible.

As the angle conversion member 52, in place of the tapered rod, a compound parabolic concentrator (CPC) may be used. Even when the CPC is used as the angle conversion member 52, the same effect as that when the tapered rod is used may be obtained. Note that the light source device 100 does not necessarily include the angle conversion member 52.

A parallelization system 63 including a collimator lens etc. is provided between the light source device 100 and the optical integration system 70. The parallelization system 63 makes the angle distribution of the fluorescence Y output from the angle conversion member 52 narrower and enters the fluorescence Y with higher parallelism into the optical integration system 70. Note that the parallelization system 63 is not necessarily provided when the parallelism of the fluorescence Y output from the angle conversion member 52 is sufficiently high.

The optical integration system 70 has a first lens array 61 and a second lens array 101. The optical integration system 70 functions as a uniform illumination system that uniformizes the intensity distributions of the fluorescence Y output from the light source device 100 in the respective light modulation devices 4R, 4G as illuminated areas with the superimposition system 103. The fluorescence Y output from the parallelization system 63 enters the first lens array 61. The first lens array 61 forms the optical integration system 70 with the second lens array 101 provided downstream of the light source device 100.

The first lens array 61 has a plurality of first small lenses 61a. The plurality of first small lenses 61a are arranged in a matrix form within a plane parallel to the YZ-plane orthogonal to the optical axis AX1 of the first illumination device 20. The plurality of first small lenses 61a divide the fluorescence Y output from the angle conversion member 52 into a plurality of partial luminous fluxes. The shapes of the respective first small lenses 61a are rectangular shapes substantially similar to the shapes of the image formation areas of the light modulation devices 4R, 4G. Thereby, the respective partial luminous fluxes output from the first lens array 61 respectively efficiently enter the image formation areas of the light modulation devices 4R, 4G.

The fluorescence Y output from the first lens array 61 travels toward the second lens array 101. The second lens array 101 is placed to face the first lens array 61. The second lens array 101 has a plurality of second small lenses 101a corresponding to the plurality of first small lenses 61a of the first lens array 61. The second lens array 101 forms respective images of the plurality of first small lenses 61a of the first lens array 61 near the image formation areas of the light modulation devices 4R, 4G with the superimposition system 103. The plurality of second small lenses 101a are arranged in a matrix form within the plane parallel to the YZ-plane orthogonal to the optical axis AX1 of the first illumination device 20.

In the embodiment, the respective first small lenses 61a of the first lens array 61 and the respective second small lenses 101a of the second lens array 101 have the same size with each other, but may have different sizes from each other. Further, in the embodiment, the first small lenses 61a of the first lens array 61 and the second small lenses 101a of the second lens array 101 are placed in positions with optical axes aligned with each other, but may be placed eccentrically with each other.

The polarization conversion element 102 converts the polarization direction of the fluorescence Y output from the second lens array 101. Specifically, the polarization conversion element 102 converts the respective partial luminous fluxes of the fluorescence Y divided by the first lens array 61 and output from the second lens array 101 into linearly-polarized lights.

The polarization conversion element 102 has a polarization separation layer (not shown) transmitting one linearly-polarized component of polarization components contained in the fluorescence Y output from the light source device 100 without change and reflects the other linearly-polarized component in a direction perpendicular to the optical axis AX1, a reflection layer (not shown) reflecting the other linearly-polarized component reflected by the polarization separation layer in a direction parallel to the optical axis AX1, and a retardation film (not shown) converting the other linearly-polarized component reflected by the reflection layer into the one linearly-polarized component.

As below, features of the light source device 100 of the embodiment will be explained.

Figure 3:
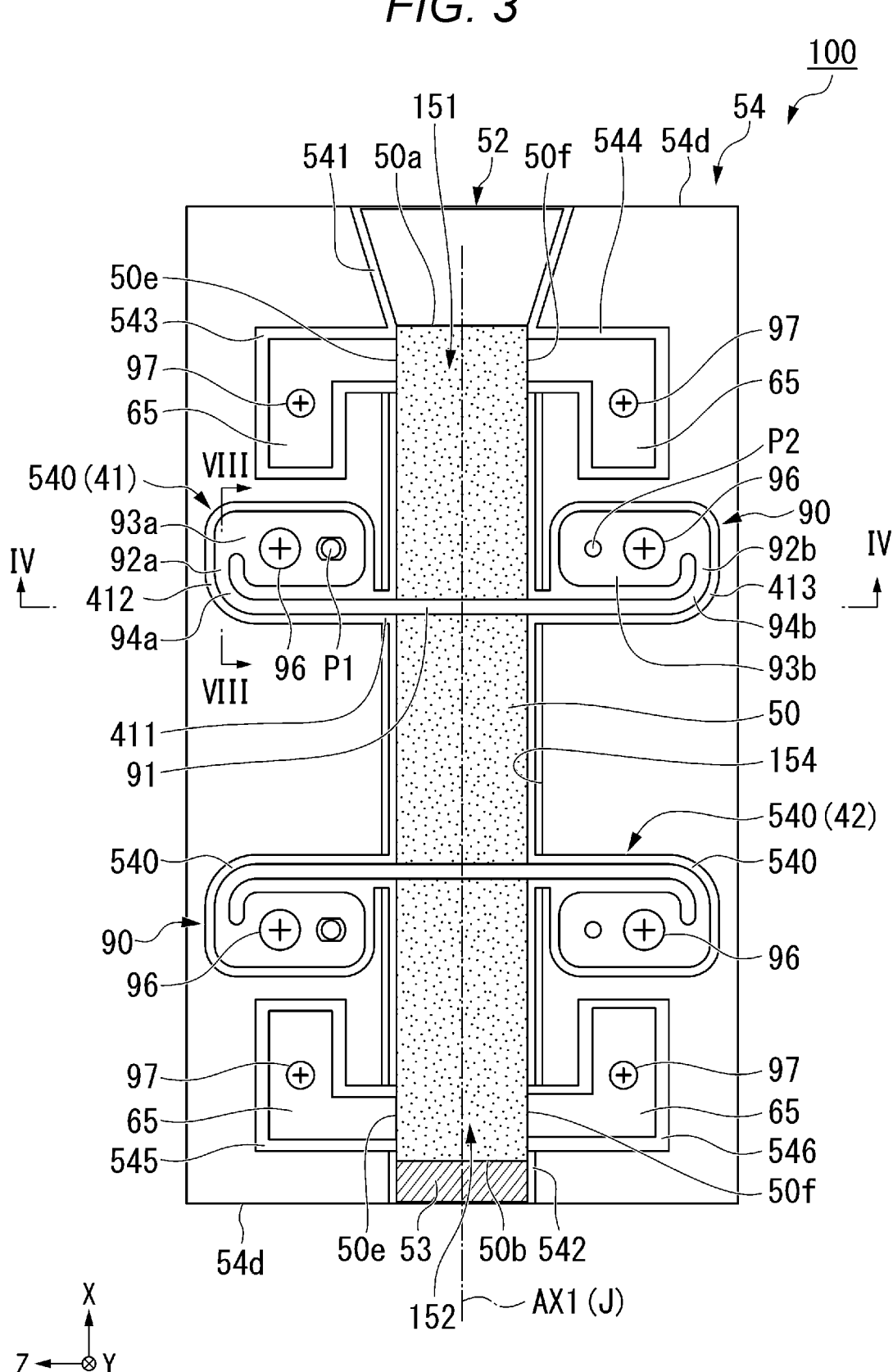
FIG. 3 is a plan view of a light source device as seen from a Y-axis direction.
Figure 4:
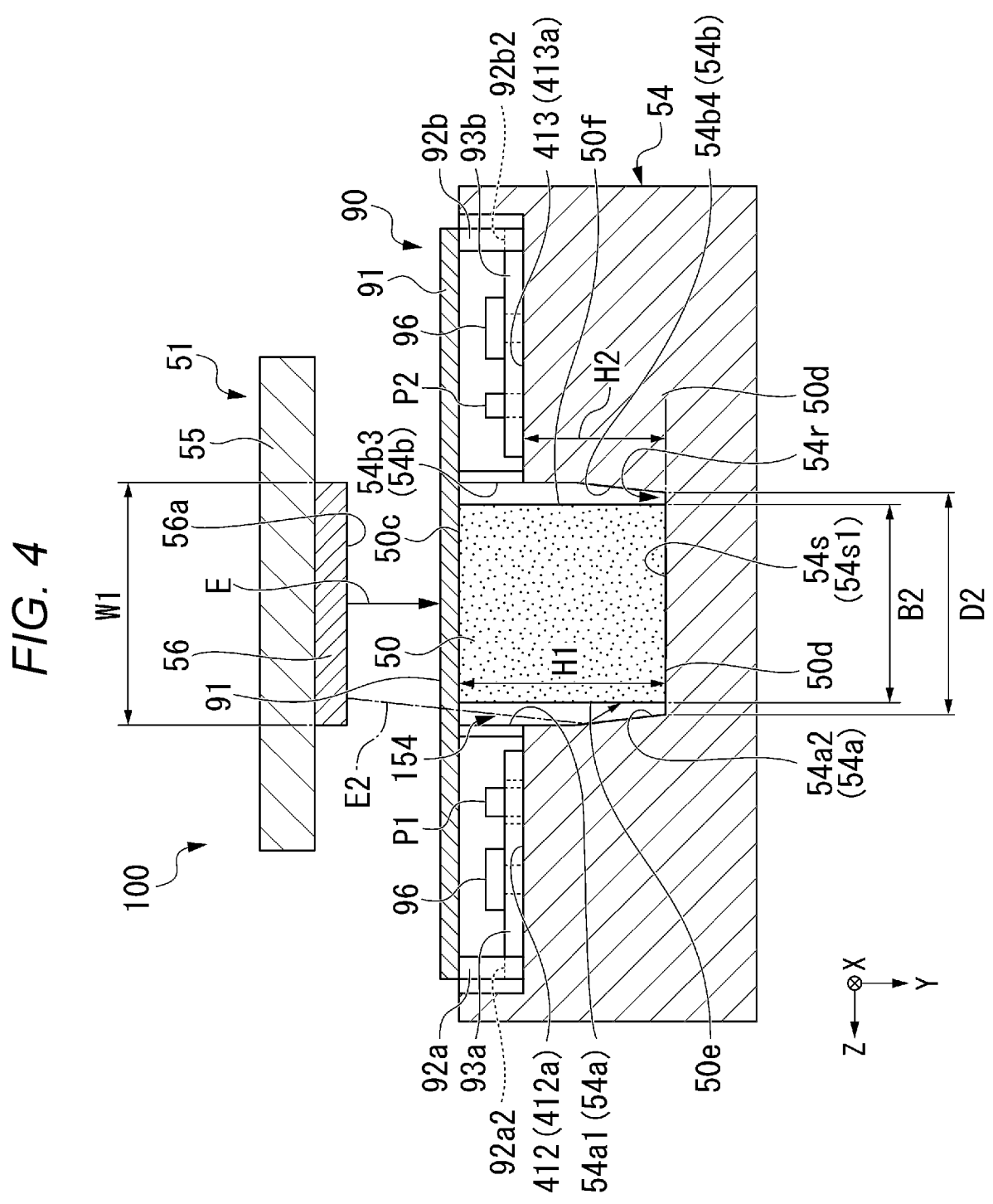
FIG. 4 is a sectional view of the light source device along line IV-IV in FIG. 3.

FIG. 3 is a plan view of the light source device 100 as seen from the Y-axis direction. FIG. 4 is a sectional view of the light source device 100 along line IV-IV in FIG. 3.

As shown in FIG. 3, the supporting member 54 is a plate-like member in a rectangular planar shape having the groove portion 154, spring fixing portions 540, a first holding portion 541, a second holding portion 542, a third holding portion 543, a fourth holding portion 544, a fifth holding portion 545, and a sixth holding portion 546.

The groove portion 154 extends in the X-axis directions along the longitudinal side of the wavelength conversion member 50 and holds a part of the wavelength conversion member 50. In the case of the embodiment, the wavelength conversion member 50 projects to the outside of the groove portion 154.

As shown in FIG. 4, the groove portion 154 of the supporting member 54 has a U-shaped section perpendicular in the X-axis directions. The groove portion 154 has a supporting surface 54s, a first wall surface 54a, and a second wall surface 54b.

The supporting surface 54s has a principal surface 54s1 corresponding to the bottom surface of the groove portion 154 and facing the fourth face 50d of the wavelength conversion member 50. In the case of the embodiment, the supporting surface 54s extends in parallel to the XZ-plane. The first wall surface 54a corresponds to one side surface of the groove portion 154, faces the fifth face 50e of the wavelength conversion member 50, and is separated from the fifth face 50e. The second wall surface 54b corresponds to the other side surface of the groove portion 154, faces the sixth face 50f of the wavelength conversion member 50, and is separated from the sixth face 50f. That is, a gap is provided between the first wall surface 54a and the fifth face 50e of the wavelength conversion member 50. A gap is provided between the second wall surface 54b and the sixth face 50f of the wavelength conversion member 50.

The first wall surface 54a has a first part 54a1 located at the third face 50c side and a second part 54a2 located at the supporting surface 54s side. The first part 54a1 extends in a direction perpendicular to the supporting surface 54s, that is, in parallel to the XY-plane. The second part 54a2 inclines closer to the fifth face 50e from the first part 54a1 side toward the supporting surface 54s side. In other words, a distance between the second part 54a2 and the fifth face 50e at the supporting surface 54s side is smaller than a distance between the second part 54a2 and the fifth face 50e at the first part 54a1 side.

The second wall surface 54b has a third part 54b3 located at the third face 50c side and a fourth part 54b4 located at the supporting surface 54s side. The third part 54b3 extends in a direction perpendicular to the supporting surface 54s, that is, in parallel to the XY-plane. The fourth part 54b4 inclines closer to the sixth face 50f from the third part 54b3 side toward the supporting surface 54s side. In other words, a distance between the fourth part 54b4 and the sixth face 50$f$ at the supporting surface 54$s$ side is smaller than a distance between the fourth part 54$b$4 and the sixth face 50$f$ at the third part 54$b$3 side.

The respective first wall surface 54$a$ and second wall surface 54$b$ are formed by the surfaces of the metal such as aluminum and stainless as the material of the supporting member 54. More specifically, the respective first wall surface 54$a$ and second wall surface 54$b$ are formed by machined surfaces obtained by mirror finishing of the metal surfaces. Accordingly, the respective first wall surface 54$a$ and second wall surface 54$b$ have light reflexibility and reflect the entering excitation light E. Note that the respective first wall surface 54$a$ and second wall surface 54$b$ may be formed by other metal films formed on the surfaces of the metal such as aluminum and stainless or dielectric multi-layer films.

The first wall surface 54$a$ and the second wall surface 54$b$ of the groove portion 154 require the mirror finishing as described above, and the part with the groove portion 154 provided therein requires higher machining accuracy than the other parts of the supporting member 54. Accordingly, the part with the groove portion 154 provided therein of the supporting member 54 may be formed using another member and another member forming the other parts than the groove portion 154 may be combined to form one supporting member 54. That is, the supporting member 54 may be formed by combination of a plurality of members. In this manner, the part surrounding the groove portion 154 is formed using the other member, and machinability and machining accuracy of the first wall surface 54$a$ and the second wall surface 54$b$ of the groove portion 154 may be increased.

A dimension W1 of the light emitting face 56$a$ of the light emitting element 56 along the Z-axis directions is larger than a width B2 of the wavelength conversion member 50 along the Z-axis directions. Note that the width in the Z-axis directions of the wavelength conversion member 50 of the embodiment is equal over the entire in the longitudinal direction.

Thereby, in the Z-axis directions, end portions of the light emitting face 56$a$ of the light emitting element 56 protrude to the outside of the third face 50$c$ of the wavelength conversion member 50. Specifically, the end portions of the light emitting face 56$a$ of the light emitting element 56 protrude to positions overlapping with the gap between the fifth face 50$e$ and the first wall surface 54$a$ and the gap between the sixth face 50$f$ and the second wall surface 54$b$. In other words, when the light emitting face 56$a$ is seen from the supporting surface 54$s$ along the Y-axis directions, a part of the light emitting face 56$a$ overlaps with the third face 50$c$ and another part of the light emitting face 56$a$ overlaps with the gap between the fifth face 50$e$ and the first wall surface 54$a$ and the gap between the sixth face 50$f$ and the second wall surface 54$b$.

A first width D2 of the supporting surface 54$s$ of the supporting member 54 along the Z-axis directions is larger than the width B2 of the wavelength conversion member 50 along the Z-axis directions. Thereby, in the Z-axis directions, end portions of the supporting surface 54$s$ protrude to the outside of the fourth face 50$d$ of the wavelength conversion member 50. In other words, when the supporting surface 54$s$ is seen from the light emitting face 56$a$ along the Y-axis directions, a part of the supporting surface 54$s$ overlaps with the fourth face 50$d$ and another part of the supporting surface 54$s$ is exposed to the outside of the fourth face 50$d$. As described above, the supporting surface 54$s$ has an exposed part 54$r$ exposed to the outside of the wavelength conversion member 50.

As shown in FIGS. 3 and 4, the pair of pressing members 90 restrict the position of the wavelength conversion member 50 in the Y-axis directions relative to the supporting member 54 in the groove portion 154. That is, the pressing members 90 restrict the movement of the wavelength conversion member 50 in the Y-axis directions in the groove portion 154.

The pair of pressing members 90 are placed in positions not overlapping with the light emitting element 56 of the light source unit 51 and press the wavelength conversion member 50 against the supporting surface 54$s$ of the groove portion 154 of the supporting member 54 (see FIG. 2). The pair of pressing members 90 are fixed to the spring fixing portions 540 of the supporting member 54. The spring fixing portions 540 will be described later.

Returning to FIG. 3, the first holding portion 541 is a concave portion communicating in the +X direction of the groove portion 154. The first holding portion 541 penetrates to an outer edge 54$d$ of the supporting member 54. The first holding portion 541 holds the first projecting portion 151 of the wavelength conversion member 50 projecting from the groove portion 154. Further, the first holding portion 541 holds the angle conversion member 52 fixed to the first face 50$a$ of the wavelength conversion member 50. In the embodiment, the angle conversion member 52 is provided on the first face 50$a$ of the first projecting portion 151. The light exiting face 52$b$ of the angle conversion member 52 held in the first holding portion 541 is level with the outer edge 54$d$ of the supporting member 54 in a plan view.

The second holding portion 542 is a concave portion communicating in the −X direction of the groove portion 154. The second holding portion 542 penetrates to the outer edge 54$d$ of the supporting member 54. The second holding portion 542 holds the second projecting portion 152 of the wavelength conversion member 50 projecting from the groove portion 154. The second holding portion 542 is provided not to communicate with the outer edge 54$d$ of the supporting member 54. In the embodiment, the mirror 53 is provided on the second face 50$b$ of the second projecting portion 152. The second holding portion 542 holds the mirror 53 provided on the second face 50$b$ of the wavelength conversion member 50.

The third holding portion 543 is a concave portion communicating in the +Z direction of the first holding portion 541. The third holding portion 543 holds the holding member 65 holding the +Z side of the first projecting portion 151 of the wavelength conversion member 50 held in the first holding portion 541. The holding member 65 is fixed to the third holding portion 543 via a screw 97.

The fourth holding portion 544 is a concave portion communicating in the −Z direction of the first holding portion 541. The fourth holding portion 544 holds the holding member 65 holding the −Z side of the first projecting portion 151 of the wavelength conversion member 50 held in the first holding portion 541. The holding member 65 is fixed to the fourth holding portion 544 via a screw 97.

The fifth holding portion 545 is a concave portion communicating in the +Z direction of the second holding portion 542. The fifth holding portion 545 holds the holding member 65 holding the +Z side of the second projecting portion 152 of the wavelength conversion member 50 held in the second holding portion 542. The holding member 65 is fixed to the fifth holding portion 545 via a screw 97.

The sixth holding portion 546 is a concave portion communicating in the −Z direction of the second holding portion 542. The sixth holding portion 546 holds the holding member 65 holding the −Z side of the second projecting portion 152 of the wavelength conversion member 50 held in the second holding portion 542. The holding member 65 is fixed to the sixth holding portion 546 via a screw 97.

The positions in the Z-axis directions of the pairs of holding members 65 sandwiching the respective first projecting portion 151 and second projecting portion 152 of the wavelength conversion member 50 from both sides are adjustable.

The wavelength conversion member 50 of the embodiment holds the respective first projecting portion 151 and second projecting portion 152 projecting to the outside of the groove portion 154 by the pair of holding members 65, and thereby, may hold the wavelength conversion member 50 in the groove portion 154 while restricting the movement in the Z-axis directions.

In the case of the embodiment, as shown in FIG. 3, the pair of pressing members 90 are placed in juxtaposition in the center part in the longitudinal direction of the wavelength conversion member 50. The pair of pressing members 90 are placed in orientations changed by 180 degrees relative to each other in the plan view in the Y-axis directions. The pair of pressing members 90 are respectively placed over the third face 50c of the wavelength conversion member 50 in the Z-axis directions along the lateral side of the wavelength conversion member 50.

In the embodiment, a total load by the pair of pressing members 90 pressing the wavelength conversion member 50 is from 1 N to 10 N. Note that, regarding the total load, the loads by the respective pressing members 90 are not necessarily the same, but the loads by the respective pressing members 90 may be different.

Here, when the total load is smaller than 1 N, the pressing force is insufficient and the wavelength conversion member 50 may be moved and displaced in the groove portion 154 due to an external force such as an impact. Further, an air layer may be produced between the fourth face 50d of the wavelength conversion member 50 and the supporting surface 54s of the groove portion 154 and heat dissipation of the wavelength conversion member 50 may be lower, and light emission efficiency may be lower.

On the other hand, when the total load is larger than 10 N, the gap between the fourth face 50d of the wavelength conversion member 50 and the supporting surface 54s of the groove portion 154 becomes too small and the air layer does not substantially exist between the fourth face 50d and the supporting surface 54s. Here, when the air layer does not substantially exist between the fourth face 50d of the wavelength conversion member 50 and the supporting surface 54s, the light is not totally reflected by the interface between the fourth face 50d and the air layer, and the light may leak from the fourth face 50d of the wavelength conversion member 50 to the supporting surface 54s and extraction efficiency of the light may be lower. Further, when the load becomes too large, the light may leak out from a crack produced by breakage of the wavelength conversion member 50.

As described above, when the total load is larger than 10 N, the extraction efficiency of the light in the wavelength conversion member 50 may be lower.

In the case of the embodiment, as described above, the total load for pressing the wavelength conversion member 50 by the pair of pressing members 90 is set to not less than 1 N and not more than 10 N, and thereby, the wavelength conversion member 50 may be stably held in the groove portion 154 in the adequate pressed condition.

For example, it is desirable that the locations where the pressing members 90 are placed are set according to a waving shape produced in the supporting surface 54s of the groove portion 154.

Figure 5:
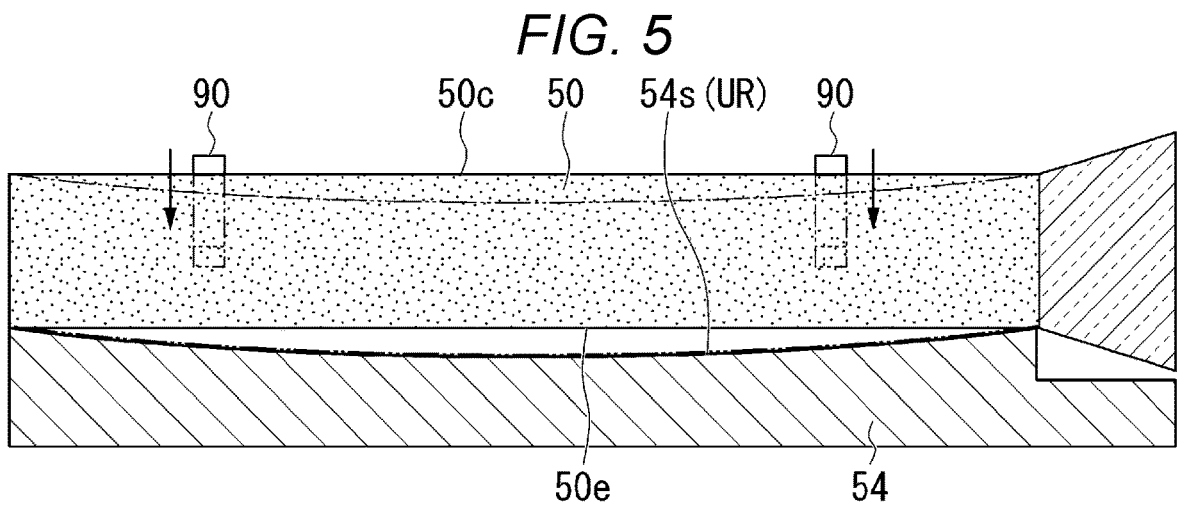
FIG. 5 shows a shape of a supporting surface suitable for a layout of pressing members.

FIG. 5 shows an example of the shape of the supporting surface 54s suitable for the layout of the pressing members 90 of the embodiment. Note that, in FIG. 5, a state after being pressed by the pressing members 90 is shown by dash-double-dot lines.

According to the layout of the pressing members 90 of the embodiment, the center part in the longitudinal direction of the wavelength conversion member 50 can be efficiently pressed to be closer to the supporting surface 54s.

The layout of the pressing members 90 of the embodiment is particularly effective in a case, as shown in FIG. 5, where the fifth face 50e of the wavelength conversion member 50 is brought into close contact with the supporting surface 54s with waving UR having a shape in which, in the X-axis directions, the height of the center part in the Y-axis directions is lower than the heights of the end parts in the Y-axis directions.

The pressing member 90 is formed using an elastically deformable material. As an example, the pressing member 90 is formed using a leaf spring made of a metal material such as a stainless material e.g., SUS 304.

Figure 6:
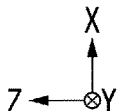
FIG. 6 is a plan view showing a configuration of the pressing member.

Subsequently, the configuration of the pressing member 90 is explained. FIG. 6 is a plan view showing the configuration of the pressing member 90. Note that FIG. 6 shows a state in which the pressing member 90 is detached from the supporting member 54, i.e., a shape before elastic deformation.

As shown in FIG. 6, the pressing member 90 has a shape symmetrical with respect to the X-axis along the longitudinal side of the wavelength conversion member 50. Accordingly, the pressing member 90 increases the uniformity of the pressing force applied to the wavelength conversion member 50 in the Z-axis directions orthogonal to the X-axis.

Specifically, the pressing member 90 includes a first extension portion 91, a pair of second extension portions 92a, 92b, a pair of fixing portions 93a, 93b, and a pair of first coupling portions 94a, 94b.

The pressing member 90 is formed using a plate material having a uniform thickness. The pressing member 90 is formed by e.g., press working of a plate material into a desired shape. Accordingly, in the pressing member 90, all of the first extension portion 91, the second extension portions 92a, 92b, the fixing portions 93a, 93b, and the first coupling portions 94a, 94b have the same thickness.

The first extension portion 91 is a part extending in a direction closer to a direction along the Z-axis than a direction along the X-axis, and contacts the third face 50c of the wavelength conversion member 50. Here, extending in the direction closer to the direction along the Z-axis than the direction along the X-axis refers not only to extending in parallel to the Z-axis but also to extending in a direction closer to the Z-axis side than the X-axis when crossing the Z-axis. In the case of the embodiment, the first extension portion 91 extends in a direction parallel to the Z-axis.

The respective second extension portions 92a, 92b are parts extending in a direction closer to a direction along the X-axis than a direction along the Z-axis and having one ends coupled to the first extension portion 91 via the first coupling portions 94a, 94b, which will be described later, and the other ends fixed to the supporting member 54. Here, extending in the direction closer to the direction along the X-axis than the direction along the Z-axis refers not only to extending in the direction parallel to the X-axis but also to extending in a direction closer to the X-axis side than the Z-axis when crossing the X-axis. In the case of the embodiment, the respective second extension portions 92a, 92b extend in a direction parallel to the X-axis. Specifically, the second extension portion 92a is placed at the +Z side of the first extension portion 91 and the second extension portion 92b is placed at the −Z side of the first extension portion 91.

The respective first coupling portions 94a, 94b are curved in arc shapes and couple the first extension portion 91 and the second extension portions 92a, 92b. Specifically, the first coupling portion 94a has an arc shape coupling one end located at the +Z side of the first extension portion 91 and one end located at the −X side of the second extension portion 92a and being convex outward from inside of the pressing member 90. The first coupling portion 94b has an arc shape coupling the other end located at the −Z side of the first extension portion 91 and one end located at the −X side of the second extension portion 92b and being convex outward from inside of the pressing member 90.

In the pressing member 90 of the embodiment, the first coupling portions 94a, 94b coupling the first extension portion 91 and the second extension portions 92a, 92b are curved in the arc shapes, and thereby, stress concentration on the coupling parts between the first extension portion 91 and the second extension portions 92a, 92b may be relaxed. Therefore, the loads on the coupling parts between the first extension portion 91 and the second extension portions 92a, 92b when the pressing member 90 elastically deforms are reduced, and thereby, durability and reliability of the pressing member 90 may be increased.

Note that, in the embodiment, the first coupling portions 94a, 94b are described as different parts from the first extension portion 91 or the second extension portions 92a, 92b, however, the first coupling portions 94a, 94b may be part of the first extension portion 91 or the second extension portions 92a, 92b. In the pressing member in this case, the first extension portion and the second extension portions are directly coupled not via the first coupling portions.

The respective fixing portions 93a, 93b are parts coupled to the other ends located at the +X side of the second extension portions 92a, 92b and fixed to the supporting member 54. That is, the respective fixing portions 93a, 93b are parts fixing the other ends of the second extension portions 92a, 92b to the supporting member 54.

The fixing portions 93a, 93b are provided to form a pair in the Z-axis directions in which the first extension portion 91 extends in the respective component parts of the pressing member 90.

Specifically, the fixing portion 93a fixes the end part at the +X side of the second extension portion 92a to the supporting member 54 and the fixing portion 93b fixes the end part at the +X side of the second extension portion 92b to the supporting member 54. Note that the fixing portions 93a, 93b are fixed to the supporting member 54 by screws 96.

The fixing portion 93a includes a fixing plate 930 fixed to the supporting member 54. The planar shape of the fixing plate 930 is substantially a rectangular shape elongated in the Z-axis directions. In the fixing plate 930, a dimension of a coupling part 930a to the second extension portion 92a in the X-axis directions is smaller than those of the other parts.

The fixing plate 930 has an opening K1 for insertion of the screw 96, a pin hole PK1 for insertion of a first positioning pin P1, which will be described later, and a cutout S0 formed in the coupling part 930a to the second extension portion 92a. The opening K1 has a circular shape and the pin hole PK1 has a slotted hole shape elongated in the Z-axis directions. The cutout S0 extends along the inner surface of the second extension portion 92a and is formed in the coupling part 930a of the fixing plate 930.

The fixing portion 93b includes a fixing plate 931 fixed to the supporting member 54. The planar shape of the fixing plate 931 is substantially a rectangular shape elongated in the Z-axis directions. In the fixing plate 931, a dimension of a coupling part 931a to the second extension portion 92b in the X-axis directions is smaller than those of the other parts.

The fixing plate 931 has an opening K2 for insertion of the screw 96, a pin hole PK2 for insertion of a second positioning pin P2, which will be described later, and a cutout S0 formed in the coupling part 931a to the second extension portion 92b. In the case of the embodiment, the opening K2 and the pin hole PK2 have circular shapes. The cutout S0 extends along the inner surface of the second extension portion 92b and is formed in the coupling part 931a of the fixing plate 931.

As shown in FIG. 3, the spring fixing portions 540 holding the respective pressing members 90 are placed on both sides of the groove portion 154 in the Z-axis directions along the lateral side of the wavelength conversion member 50.

The spring fixing portion 540 includes a first holding groove 41 holding the pressing member 90 at one side (+X side) of the pair of pressing members 90 and a second holding groove 42 holding the pressing member 90 at the other side (−X side) of the pair of pressing members 90. The first holding groove 41 and the second holding groove 42 are provided to correspond to the positions of the respective pressing members 90. The first holding groove 41 and the second holding groove 42 correspond to "holding groove" in What is Claimed is.

The first holding groove 41 is provided on both sides of the groove portion 154 in the Z-axis directions along the lateral side of the wavelength conversion member 50. The first holding groove 41 includes a first groove 411 extending in the Z-axis directions and communicating with the groove portion 154, a second groove 412 communicating in the +Z direction of the first groove 411, a third groove 413 communicating in the −Z direction of the first groove 411, the first positioning pin P1, and a second positioning pin P2.

The first holding groove 41 also functions as a guide for attachment of the pressing member 90 to the supporting member 54. Thereby, the assembling work of the pressing member 90 to the supporting member 54 is easier.

The first groove 411 is a groove holding a part of the first extension portion 91 in the pressing member 90.

The second groove 412 is a groove holding a part projecting from the first groove 411 toward the +Z side of the pressing member 90. That is, the second groove 412 holds a part of the first extension portion 91 projecting from the first groove 411 toward the +Z side, the first coupling portion 94a, the second extension portion 92a, and the fixing portion 93a.

The third groove 413 is a groove holding a part projecting from the first groove 411 toward the −Z side of the pressing member 90. That is, the third groove 413 holds a part of the first extension portion 91 projecting from the first groove 411 toward the −Z side, the first coupling portion 94b, the second extension portion 92b, and the fixing portion 93b.

In the first holding groove 41, heights of bottom surfaces in the Y-axis directions of the first groove 411, the second groove 412, and the third groove 413 are equal to one another.

As shown in FIG. 4, a bottom surface 412a of the second groove 412 fixes the fixing portion 93a coupled to the second extension portion 92*a* by the screw 96. Accordingly, the bottom surface 412*a* of the second groove 412 is regarded as a fixing surface fixing another end 92*a*2 of the second extension portion 92*a*.

Further, a bottom surface 413*a* of the third groove 413 fixes the fixing portion 93*b* coupled to the second extension portion 92*b* by the screw 96. Accordingly, the bottom surface 413*a* of the third groove 413 is regarded as a fixing surface fixing another end 92*b*2 of the second extension portion 92*b*.

The first positioning pin P1 projects from the surface 412*a* of the second groove 412 and is inserted into the pin hole PK1 formed in the fixing portion 93*a* of the pressing member 90. The second positioning pin P2 projects from the bottom surface 413*a* of the third groove 413 and is inserted into the pin hole PK2 formed in the fixing portion 93*b* of the pressing member 90.

Regarding the supporting member 54, the first positioning pin P1 and the second positioning pin P2 are inserted into the respective pin holes PK1, PK2 of the fixing portions 93*a*, 93*b*, and thereby, the pressing member 90 can be positioned with respect to the supporting member 54. In the case of the embodiment, the pin hole PK1 of the pin holes PK1, PK2 is machined to be elongated, and thereby, a configuration in which a dimension error between the pin holes PK1, PK2 is allowed and positioning of the pressing member 90 and the supporting member 54 is easier is realized.

In the pressing member 90 of the embodiment, the hole diameters of the pin holes PK1, PK2 in the pair of fixing portions 93*a*, 93*b* are different. That is, the outer diameters of the first positioning pin P1 and the second positioning pin P2 are different.

The pressing member 90 of the embodiment is formed by press working as described above, and burrs are produced in opening ends at one side of the pin holes PK1, PK2 or the openings K1, K2. When the surface at the side with the burr is placed in contact with the supporting member 54, a gap is produced between the pressing member 90 and the supporting member 54 due to the burr and the pressing member 90 does not closely contact the supporting member 54, and thereby, the pressing member 90 is hard to be stably attached to the supporting member 54 and the held condition of the wavelength conversion member 50 becomes unstable.

On the other hand, in the pressing member 90 of the embodiment, the hole diameters of the pin holes PK1, PK2 are different. When the pressing member 90 is to be attached to the supporting member 54 on the wrong side, the attachment of the pressing member 90 is impossible because the position relationship between the positioning pins P1, P2 relative to the pin holes PK1, PK2 are inverted. That is, the side of the pressing member 90 of the embodiment to be attached to the supporting member 54 is determined, and the attachment of the pressing member 90 in the orientation in which the direction of the production of the burr is in contact with the supporting member 54 side may be avoided.

Therefore, the pressing member 90 of the embodiment can be attached to the supporting member 54 on the right side, and the pressing member 90 may be stably attached to the supporting member 54 without consideration of the influence by the burr.

Further, in the pressing member 90 of the embodiment, the long side directions of the fixing plates 930, 931 occupying the larger parts of the areas of the fixing portions 93*a*, 93*b* are aligned with the longitudinal direction (Z-axis direction) of the first extension portion 91. Accordingly, in the pressing member 90 of the embodiment, downsizing of the dimension in the X-axis directions is realized.

Furthermore, in the pressing member 90 of the embodiment, the respective pair of fixing portions 93*a*, 93*b* are located between the pair of second extension portions 92*a*, 92*b* in the Z-axis directions along the lateral side of the wavelength conversion member 50. That is, in the pressing member 90 of the embodiment, the fixing portions 93*a*, 93*b* are located inside of the second extension portions 92*a*, 92*b* in the Z-axis directions.

Therefore, according to the pressing member 90 of the embodiment, the fixing portions 93*a*, 93*b* are placed inside of the second extension portions 92*a*, 92*b*. Compared to a case where the fixing portions 93*a*, 93*b* are placed outside of the second extension portions 92*a*, 92*b*, upsizing of the dimension in the pressing member 90 in the Z-axis directions may be suppressed.

Here, in FIG. 4, a height of the third face 50*c* of the wavelength conversion member 50 placed in the groove portion 154 in the Y-axis directions relative to the supporting surface 54*s* is a first height H1. Further, in the first holding groove 41, a height of the bottom surface 412*a* of the second groove 412 and the bottom surface 413*a* of the third groove 413 as fixing surfaces fixing the other ends 92*a*2, 92*b*2 of the second extension portions 92*a*, 92*b* in the Y-axis directions relative to the supporting surface 54*s* is a second height H2.

In the light source device 100 of the embodiment, as shown in FIG. 4, the first height H1 is higher than the second height H2.

That is, when placed in the groove portion 154 of the supporting member 54, the third face 50*c* of the wavelength conversion member 50 is in the higher position than the fixing positions of the fixing portions 93*a*, 93*b* of the pressing member 90.

Accordingly, when the fixing portions 93*a*, 93*b* of the pressing member 90 placed so that the first extension portion 91 is over the third face 50*c* of the wavelength conversion member 50 in the Z-axis directions are fixed to the supporting member 54, with the first extension portion 91 pushed up by the third face 50*c*, the second extension portions 92*a*, 92*b* and the first coupling portions 94*a*, 94*b* elastically deform in the −Y direction, i.e., a direction crossing the principal surface 54*s*1 of the supporting surface 54*s*.

As described above, the first extension portion 91, the pair of second extension portions 92*a*, 92*b*, and the pair of first coupling portions 94*a*, 94*b* elastically deform in the Y-axis direction crossing the principal surface 54*s*1 of the supporting surface 54*s* as leaf springs, and thereby, the pressing member 90 of the embodiment can urge the third face 50*c* of the wavelength conversion member 50.

In the case of the embodiment, regarding the fixing portions 93*a*, 93*b*, part of the fixing portions 93*a*, 93*b* elastically deform with the first coupling portions 94*a*, 94*b* by the cutouts S0 formed in the coupling parts 930*a*, 931*a* to the first coupling portions 94*a*, 94*b*. That is, the part of the fixing portions 93*a*, 93*b* function as a leaf spring and the longer length of the leaf spring may be secured.

More specifically, in the pressing member 90 of the embodiment, a reaction force by the elastically deforming spring part is transmitted to the wavelength conversion member 50 by the first extension portion 91 in contact with the third face 50*c*, and thereby, the wavelength conversion member 50 may be urged in the +Y direction.

Particularly, the pressing member 90 of the embodiment has the first extension portion 91 and the second extension portions 92*a*, 92*b* coupled to the first extension portion 91 and extending in the longitudinal direction of the wavelength conversion member 50, and the length of the leaf spring part to elastically deform can be secured to be larger.

Here, a relationship between a spring load and displacement of the leaf spring is explained.

Figure 7:
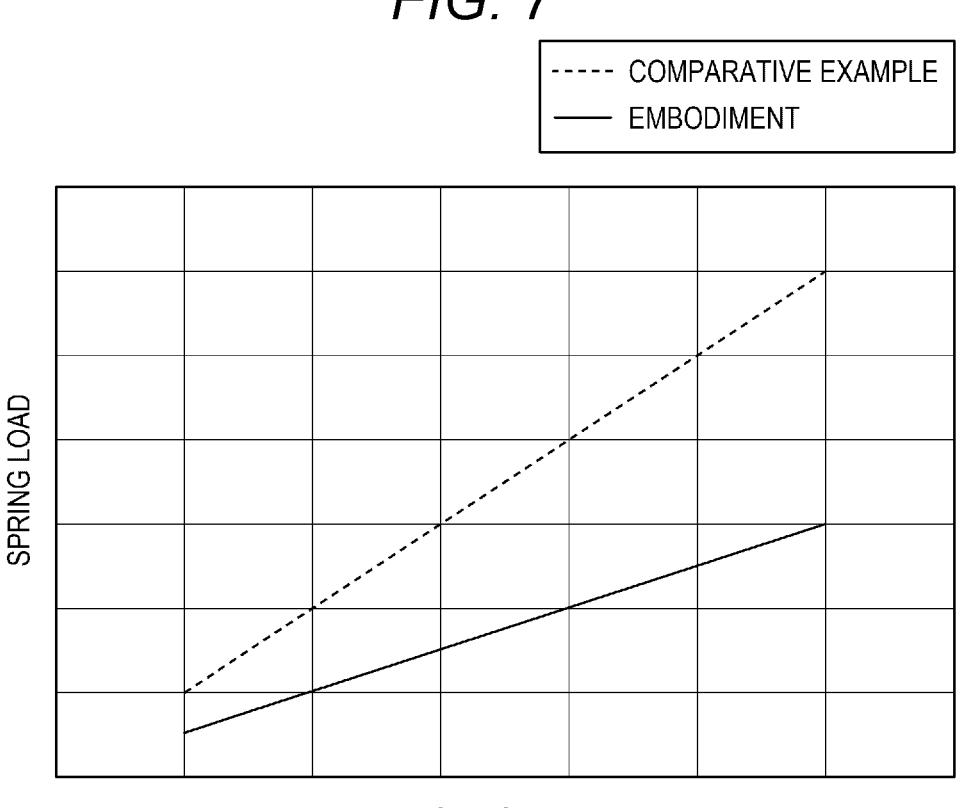
FIG. 7 is a graph showing relationships between spring loads and displacement in the pressing members.

FIG. 7 is a graph showing the relationship between the spring load and the displacement in the pressing member 90 of the embodiment. In the graph shown in FIG. 7, the lateral axis corresponds to the displacement and the longitudinal axis corresponds to the spring load. In FIG. 7, in addition to the relationship between the spring load and the displacement in the pressing member 90 of the embodiment, a relationship n a spring load and displacement in a pressing member in which a spring length of a leaf spring is shorter than that of the pressing member 90 of the embodiment is shown for comparison.

Compared to the pressing member of the comparative example, the spring length of the leaf spring of the pressing member 90 of the embodiment is sufficiently long. As shown in FIG. 7, the pressing member 90 of the embodiment has the more gradual relationship between the spring load and the displacement, in other words, the gradient thereof is smaller compared to the pressing member of the comparative example. That is, from the graph shown in FIG. 7, it may be confirmed that the longer the spring length of the leaf spring, the more gradual the relationship between the spring load and the displacement.

In the case where the relationship between the spring load and the displacement is more gradual, for example, even when the displacement varies depending on tolerances of the members, the change of the spring load is smaller and the spring load can be stabilized. That is, even when the displacement varies due to the influence of the tolerances, the spring load is harder to be below a predetermined load required in design, and a highly reliable spring stably providing a desired spring load can be realized.

Here, increase of the size of the leaf spring is considered to set the relationship between the spring load and the displacement more gradual. However, the increase of the size of the leaf spring causes upsizing of the light source device itself, and the increase of the size of the leaf spring itself is not desirable.

On the other hand, as described above, the pressing member 90 of the embodiment includes the second extension portions 92a, 92b extending from the first extension portion 91 in the longitudinal direction of the wavelength conversion member 50, and thereby, upsizing of the wavelength conversion member 50 in the lateral direction may be suppressed and the spring length of the leaf spring may be secured to be larger.

Accordingly, in the pressing member 90 of the embodiment, the relationship between the spring load and the displacement is more gradual as shown in FIG. 7 and, even when the displacement varies due to the influence of the tolerance of the pressing member 90, the change of the spring load is smaller and the desired spring load may be stably obtained.

Therefore, in the pressing member 90 of the embodiment, the third face 50c of the wavelength conversion member 50 is urged with the predetermined spring load, and thereby, the fourth face 50d of the wavelength conversion member 50 may be brought into stable contact with the supporting surface 54s of the groove portion 154.

Figure 8:
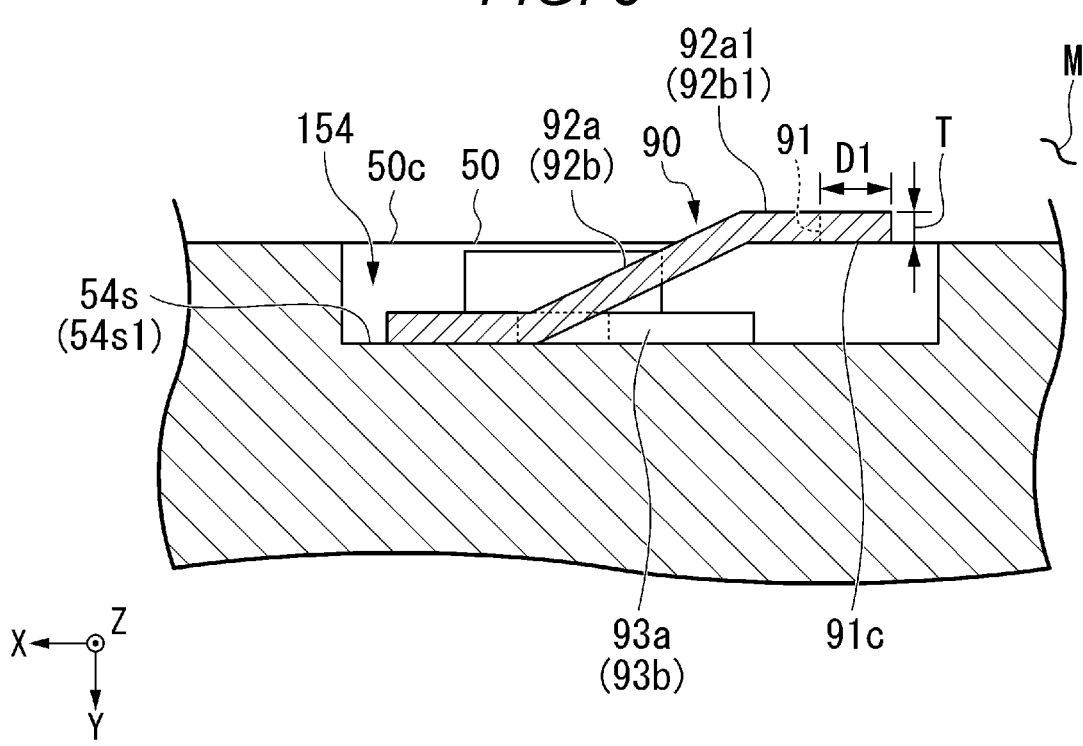
FIG. 8 is a sectional view showing the pressing member along line VIII-VIII in FIG. 3 in a direction of an arrow.

FIG. 8 is a sectional view showing the pressing member 90 along line VIII-VIII in FIG. 3 in a direction of an arrow.

In the pressing member 90 of the embodiment, as shown in FIG. 8, the second extension portions 92a, 92b have shapes in which one ends 92a1, 92b1 sides (the first extension portion 91 side) are bent toward the principal surface 54s1 of the supporting surface 54s of the groove portion 154 in the sectional view along a virtual plane M along the XY-plane containing the X-axis and the Y-axis.

Here, as an assumption, a case where the second extension portions 92a, 92b have unbendable plate-like shapes is considered. When the second extension portions 92a, 92b have plate-like shapes, corner parts at the second extension portions 92a, 92b sides (−X side) in the surface facing the wavelength conversion member 50 in the first extension portion 91 are in contact with the third face 50c of the wavelength conversion member 50. Accordingly, the third face 50c of the wavelength conversion member 50 may be damaged by being scraped or broken by the corner parts.

On the other hand, according to the pressing member 90 of the embodiment, as shown in FIG. 8, the one ends 92a1, 92b1 of the second extension portions 92a, 92b have the shapes bent toward the supporting surface 54s of the groove portion 154, and thereby, an opposing surface 91c facing the +Y side and opposing to the wavelength conversion member 50 of the first extension portion 91 is in contact with the third face 50c of the wavelength conversion member 50. That is, the opposing surface 91c of the first extension portion 91 is in surface contact with the third face 50c of the wavelength conversion member 50. Therefore, the pressing member 90 of the embodiment may stably press the third face 50c without damaging the third face 50c of the wavelength conversion member 50.

Further, in the case of the pressing member 90 of the embodiment, as shown in FIG. 8, a thickness T of the first extension portion 91 and the second extension portions 92a, 92b is smaller than a width D1 in the X-axis directions orthogonal to the extension direction of the first extension portion 91 and a width D2 (see FIG. 6) in the Z-axis directions orthogonal to the extension direction of the second extension portions 92a, 92b. Note that, in the embodiment, the dimensions of the widths D1, D2 are the same, but the dimensions of the widths D1, D2 may be different.

As described above, in the pressing member 90 of the embodiment, the thickness T of the first extension portion 91 and the second extension portions 92a, 92b is smaller than the respective widths D1, D2 and, when elastically deforming, the deformation in the plate thickness direction may be made larger while the deformation in the width direction is suppressed in the first extension portion 91. Therefore, in the pressing member 90 of the embodiment, the first extension portion 91 in contact with the third face 50c of the wavelength conversion member 50 can efficiently elastically deform in the plate thickness direction, and thereby, may efficiently press the third face 50c of the wavelength conversion member 50.

The second holding groove 42 shown in FIG. 3 has the same shape as the first holding groove 41. The first holding groove 41 and the second holding groove 42 are placed in orientations changed by 180 degrees relative to each other in the plan view in the Y-axis direction. Note that the same as the first holding groove 41 applies to the second holding groove 42 and the explanation of the details is omitted. The pressing member 90 placed in the second holding groove 42 may stably press the third face 50c of the wavelength conversion member 50 like the pressing member 90 placed in the first holding groove 41.

The light source device 100 of the embodiment includes the light emitting element 56 outputting the excitation light E, the wavelength conversion member 50 entered by the excitation light E output from the light emitting element 56, the supporting member 54 supporting the wavelength conversion member 50 in the supporting member 54, and the pressing member 90 pressing the wavelength conversion member 50 against the supporting member 54. The wavelength conversion member 50 has the first face 50*a* and the second face 50*b* located at sides opposite to each other on the X-axis along the longitudinal side of the wavelength conversion member 50, the third face 50*c* and the fourth face 50*d* located at sides opposite to each other on the Y-axis crossing the X-axis, and the fifth face 50*e* and the sixth face 50*f* located at sides opposite to each other on the Z-axis crossing the X-axis and the Y-axis. The first face 50*a* of the wavelength conversion member 50 outputs the fluorescence Y guided through the wavelength conversion member 50, the light emitting element 56 is provided to face the third face 50*c*, and the groove portion 154 has the supporting surface 54*s* facing the fourth face 50*d*. The pressing member 90 has the first extension portion 91 extending along the Z-axis and contacting the third face 50*c*, and the pair of second extension portions 92*a*, 92*b* extending along the X-axis and having the one ends 92*a*l, 92*b*1 coupled to the first extension portion 91 and the other ends 92*a*2, 92*b*2 fixed to the supporting member 54, and elastically deforms in the Y-axis direction crossing the principal surface 54*s*1 of the supporting surface 54*s* to urge the third face 50*c*.

According to the light source device 100 of the embodiment, the first extension portion 91 and the second extension portions 92*a*, 92*b* are provided, and thereby, the wavelength conversion member 50 may be pressed against the supporting member 54 by the downsized pressing member 90 having the larger spring length. The pressing member 90 of the embodiment has a property providing the gradual relationship between the spring load and the displacement and, even when the displacement varies due to the influence of the tolerance, the change of the spring load is smaller and the desired spring load may be stably obtained.

Accordingly, the wavelength conversion member 50 may be accurately placed in the stable pressed condition within the groove portion 154. Therefore, the heat of the wavelength conversion member 50 is transmitted to the supporting member 54 side and the temperature rise of the wavelength conversion member 50 is suppressed, and thereby, reduction of fluorescence conversion efficiency due to the temperature rise of the wavelength conversion member 50 may be suppressed and the fluorescence Y having the desired intensity may be output. Further, the pressing force of the wavelength conversion member 50 becoming larger than a predetermined value and an excessively large load on the wavelength conversion member 50 may be prevented. Furthermore, a defect including deterioration of e.g., an adhesive weak against heat placed around by the heat of the wavelength conversion member 50 at a high temperature may be prevented.

More specifically, as shown in FIG. 4, a partial excitation light E2 output from the light emitting face 56*a* of the light emitting element 56 travels through the gap between the fifth face 50*e* of the wavelength conversion member 50 and the first part 54*a*l, and then, enters the second part 54*a*2 inclined relative to the supporting surface 54*s*. Here, the excitation light E2 is reflected by the second part 54*a*2 and enters the fifth face 50*e* of the wavelength conversion member 50. As described above, the excitation light E2 passing through the gap between the fifth face 50*e* of the wavelength conversion member 50 and the first part 54*a*1 easily enters the fifth face 50*e*, and thereby, the amount of the excitation light E reflected by the supporting surface 54*s* and returning to the side of the light source unit 51 may be reduced. Further, part of the excitation light E is reflected by the first part 54*a*l extending perpendicularly to the supporting surface 54*s* and enters the fifth face 50*e* of the wavelength conversion member 50. Thereby, the light source device 100 by which the use efficiency of the excitation light E is higher and the fluorescence Y having desired intensity is easily obtained may be realized.

The projector 1 of the embodiment includes the light source device 100 of the embodiment and has higher light use efficiency.

First Modified Example

As below, a first modified example of the embodiment will be explained.

Figure 9:
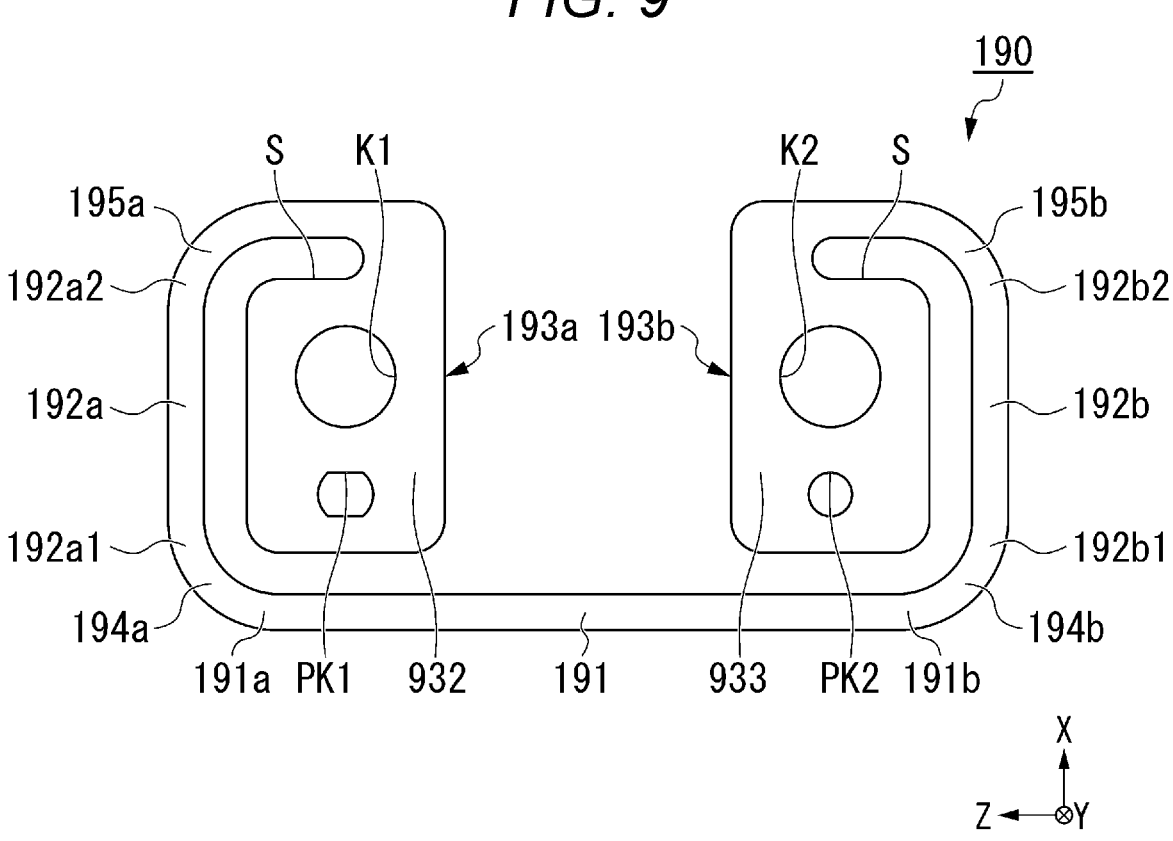
FIG. 9 is a plan view showing a configuration of a pressing member of a first modified example.

FIG. 9 is a plan view showing a configuration of a pressing member of the first modified example. Note that FIG. 9 shows a state in which the pressing member is detached from the supporting member 54, i.e., a shape before elastic deformation. In the following drawing, the common component elements with the pressing member 90 of the above described embodiment have the same signs and the explanation thereof will be omitted.

As shown in FIG. 9, a pressing member 190 of the modified example has a shape symmetrical with respect to the X-axis along the longitudinal side of the wavelength conversion member 50, and includes a first extension portion 191, a pair of second extension portions 192*a*, 192*b*, a pair of fixing portions 193*a*, 193*b*, a pair of first coupling portions 194*a*, 194*b*, and a pair of second coupling portions 195*a*, 195*b*.

The pressing member 190 is molded by press working of a plate material having a uniform thickness into a desired shape, and all of the first extension portion 191, the second extension portions 192*a*, 192*b*, fixing portions 193*a*, 193*b*, the first coupling portions 194*a*, 194*b*, and the second coupling portions 195*a*, 195*b* have the same thickness.

The first extension portion 191 extends along the Z-axis and contacts the third face 50*c* of the wavelength conversion member 50. The respective second extension portions 192*a*, 192*b* extend along the X-axis, have one ends coupled to the first extension portion 191 via the first coupling portions 194*a*, 194*b* and the other ends fixed to the supporting member 54. The second extension portion 192*a* is placed at the +Z side of the first extension portion 191 and the second extension portion 192*b* is placed at the −z side of the first extension portion 191.

The first coupling portion 194*a* has an arc shape coupling one end 191*a* of the first extension portion 191 and one end 192*a*1 of the second extension portion 192*a* and being convex outward from inside of the pressing member 190. The first coupling portion 194*b* has an arc shape coupling the other end 191*b* of the first extension portion 191 and one end 192*b*1 of the second extension portion 192*b* and being convex outward from inside of the pressing member 190. Note that the first coupling portions 194*a*, 194*b* may be formed by part of the first extension portion 191 or the second extension portions 192*a*, 192*b*.

The second coupling portion 195*a* has an arc shape coupling the fixing portion 193*a*, which will be described later, and the other end 192*a*2 of the second extension portion 192*a* and being convex outward from inside of the pressing member 190. The second coupling portion 195*b* has an arc shape coupling the fixing portion 193*b*, which will be described later, and the other end 192*b*2 of the second extension portion 192*a* and being convex outward from inside of the pressing member 190. Note that the second coupling portions 195*a*, 195*b* may be formed by part of the second extension portions 192*a*, 192*b* or the fixing portions 193*a*, 193*b*.

In the modified example, the second coupling portions 195a, 195b are curved in the arc shapes, and thereby, stress concentration on the coupling parts between the second extension portions 192a, 192b and the fixing portions 193a, 193b may be relaxed. Therefore, the loads on the coupling parts between the second extension portions 192a, 192b and the fixing portions 193a, 193b when the pressing member 190 elastically deforms are reduced, and thereby, durability and reliability of the pressing member 190 may be increased.

The respective fixing portions 193a, 193b are coupled to the other ends 192a2, 192b2 of the second extension portions 192a, 192b via the second coupling portions 195a, 195b.

The fixing portion 193a includes a fixing plate 932 fixed to the supporting member 54. The planar shape of the fixing plate 932 is substantially a rectangular shape elongated in the X-axis directions. The fixing plate 932 includes the opening K1 and the pin hole PK1 formed in juxtaposition in the X-axis directions and a slit S extending in the –Z direction. The slit S is formed in the fixing plate 932 to extend along the inner surface of the second coupling portion 195a.

On the other hand, the fixing portion 193b includes a fixing plate 933 fixed to the supporting member 54. The planar e of the fixing plate 933 is substantially a rectangular shape elongated in the X-axis directions. The fixing plate 933 includes the opening K2 and the pin hole PK2 formed in juxtaposition in the X-axis directions and a slit S extending in the +Z direction. The slit S is formed in the fixing plate 933 to extend along the inner surface of the second coupling portion 195b.

In the pressing member 190 of the modified example, the short side directions of the fixing plates 932, 933 occupying the larger parts of the areas of the fixing portions 193a, 193b are aligned with the longitudinal direction (Z-axis direction) of the first extension portion 191. Accordingly, in the pressing member 190 of the modified example, downsizing of the dimension in the Z-axis directions is realized.

Further, in the pressing member 190 of the modified example, the respective pair of fixing portions 193a, 193b are located between the pair of second extension portions 192a, 192b in the Z-axis directions along the lateral side of the wavelength conversion member 50. That is, in the pressing member 190 of the modified example, the fixing portions 193a, 193b are located inside of the second extension portions 192a, 192b in the Z-axis directions, and thereby, upsizing of the dimension in the Z-axis directions may be suppressed compared to a case where the fixing portions 193a, 193b are located outside of the second extension portions 192a, 192b.

In the pressing member 190 of the modified example, the first extension portion 191, the pair of second extension portions 192a, 192b, the pair of first coupling portions 194a, 194b, and the pair of second coupling portions 195a, 195b elastically deform in the Y-axis direction as leaf springs. Further, in the case of the modified example, part of the fixing portions 193a, 193b elastically deform with the second coupling portions 195a, 195b.

Accordingly, the pressing member 190 of the modified example having the smaller size, but the sufficient spring length may stably press the wavelength conversion member 50 against the supporting member 54.

Second Modified Example

Subsequently, a second modified example of the embodiment will be explained.

Figure 10:
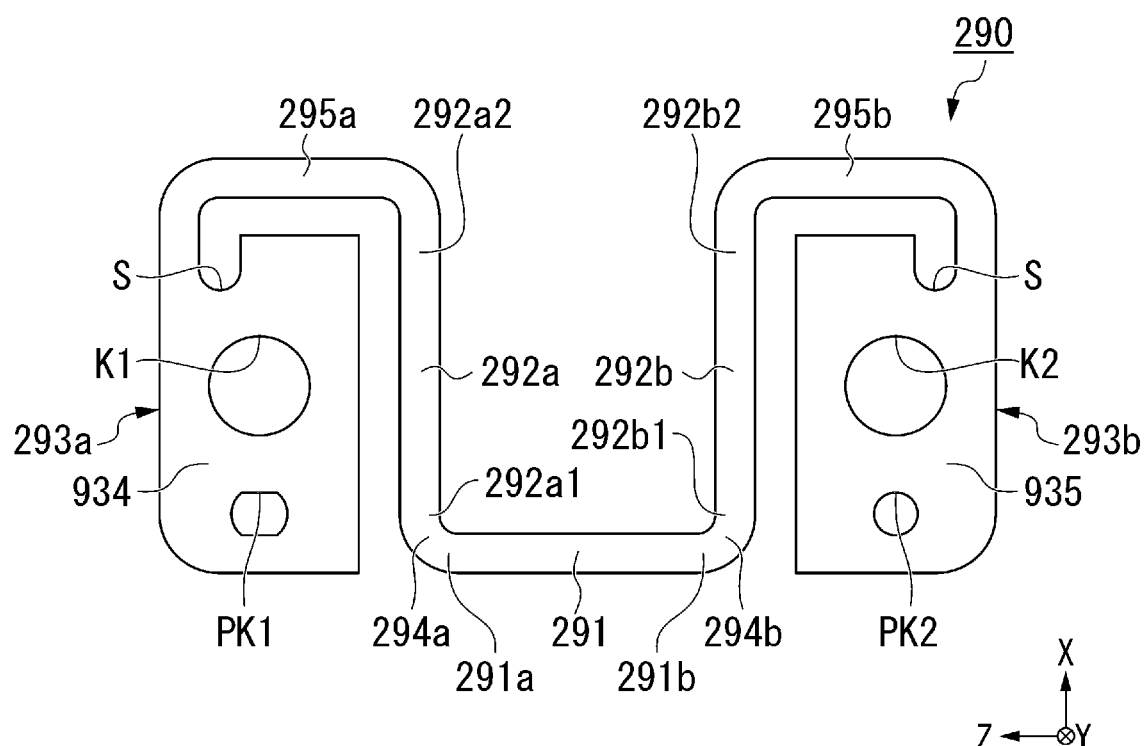
FIG. 10 is a plan view showing a configuration of a pressing member of a second modified example.

FIG. 10 is a plan view showing a configuration of a pressing member of the second modified example. Note that FIG. 10 shows a state in which the pressing member is detached from the supporting member 54, i.e., a shape before elastic deformation. In the following drawing, the common component elements with the pressing member 90 of the above described embodiment have the same signs and the explanation thereof will be omitted.

As shown in FIG. 10, a pressing member 290 of the modified example has a shape symmetrical with respect to the X-axis along the longitudinal side of the wavelength conversion member 50, and includes a first extension portion 291, a pair of second extension portions 292a, 292b, a pair of fixing portions 293a, 293b, a pair of first coupling portions 294a, 294b, and a pair of second coupling portions 295a, 295b.

The pressing member 290 is molded by press working of a plate material having a uniform thickness into a desired shape, and all of the first extension portion 291, the second extension portions 292a, 292b, the fixing portions 293a, 293b, the first coupling portions 294a, 294b, and the second coupling portions 295a, 295b have the same thickness.

The first extension portion 291 extends along the Z-axis and contacts the third face 50c of the wavelength conversion member 50. The respective second extension portions 292a, 292b extend along the X-axis, have one ends coupled to the first extension portion 291 via the first coupling portions 294a, 294b and the other ends fixed to the supporting member 54.

The first coupling portion 294a couples one end 291a of the first extension portion 291 and one end 292a1 of the second extension portion 292a and the first coupling portion 294b couples the other end 291b of the first extension portion 291 and one end 292b1 of the second extension portion 292b. Note that the first coupling portions 294a, 294b may be formed by part of the first extension portion 291 or the second extension portions 292a, 292b.

The second coupling portion 295a is a part having a substantially U-shape coupling the fixing portion 293a, which will be described later, and the other end 292a2 of the second extension portion 292a. The second coupling portion 295b is a part having a substantially U-shape coupling the fixing portion 293b, which will be described later, and the other end 292b2 of the second extension portion 292b. Note that the second coupling portions 295a, 295b may be formed by part of the second extension portions 292a, 292b or the fixing portions 293a, 293b.

The respective fixing portions 293a, 293b are coupled to the other ends 292a2, 292b2 of the second extension portions 292a, 292b via the second coupling portions 295a, 295b.

The fixing portion 293a includes a fixing plate 934 fixed to the supporting member 54. The planar shape of the fixing plate 934 is substantially a rectangular shape elongated in the X-axis directions. The fixing plate 934 includes the opening K1 and the pin hole PK1 formed in juxtaposition in the X-axis directions and a slit S extending in the –X direction. The slit S is formed in the fixing plate 934 to extend along the inner surface of the second coupling portion 295a.

On the other hand, the fixing portion 293b includes a fixing plate 935 fixed to the supporting member 54. The planar shape of the fixing plate 935 is substantially a rectangular shape elongated in the X-axis directions. The fixing plate 935 includes the opening K2 and the pin hole PK2 formed in juxtaposition in the X-axis directions and a slit S extending in the –X direction. The slit S is formed in the fixing plate 935 to extend along the inner surface of the second coupling portion 295*b*.

In the pressing member 290 of the modified example, the second coupling portions 295*a*, 295*b* are formed in the substantially U-shapes, and the long side directions of the fixing plates 934, 935 occupying the larger parts of the areas of the fixing portions 293*a*, 293*b* are aligned with the longitudinal direction (X-axis direction) of the second extension portions 292*a*, 292*b*. Thereby, in the pressing member 290 of the modified example, downsizing of the dimension in the Z-axis directions is realized.

In the pressing member 290 of the modified example, the first extension portion 291, the pair of second extension portions 292*a*, 292*b*, the pair of first coupling portions 294*a*, 294*b*, and the pair of second coupling portions 295*a*, 295*b* elastically deform in the Y-axis direction as leaf springs. Further, in the case of the modified example, part of the fixing portions 293*a*, 293*b* elastically deform with the second coupling portions 295*a*, 295*b* by the slits S. Accordingly, the pressing member 290 of the modified example having the smaller size, but the sufficient spring length may stably press the wavelength conversion member 50 against the supporting member 54.

The technical scope of the present disclosure is not limited to the above described embodiment, but various changes can be made without departing from the scope of the present disclosure.

In the light source device of the above described embodiment, the case where the pair of pressing members 90 are laid out at the inner sides than the holding members 65 in the X-axis directions along the longitudinal side of the wavelength conversion member 50 is taken as an example, however, the pair of pressing members 90 may be laid out at the outer sides of the holding members 65. The pair of pressing members 90 laid out at the outer sides of the holding members 65 are particularly effective when the fifth face 50*e* of the wavelength conversion member 50 is brought into close contact with e.g., the waving supporting surface 54*s* in which the heights of the end parts in the Y-axis directions are lower than the height of the center part in the Y-axis directions in the X-axis directions.

In the above described embodiment, the example in which the second face of the wavelength conversion member and the reflection surface of the reflection mirror are in direct contact is taken, however, another member having light transmissivity than the adhesive may intervene between the second face of the wavelength conversion member and the reflection surface of the reflection mirror. That is, the second face of the wavelength conversion member and the reflection surface of the reflection mirror are not necessarily in direct contact.

In the above described embodiment, the respective wall surfaces of the groove portion of the supporting member have the parts perpendicular to the supporting surface and the parts inclined relative to the supporting surface, however, the shape of the groove portion is not particularly limited. For example, all areas of the wall surfaces of the groove portion may be perpendicular to the supporting surface. Or, the wall surfaces of the groove portion may be curved.

In the above described embodiment, the example in which the present disclosure is applied to the light source device including the wavelength conversion member is taken, however, in place of the configuration, the present disclosure may be applied to a light source device without wavelength conversion, but with an incident light propagated therein, controlling an angle distribution and outputting the light. In this case, the wavelength conversion member of the above described embodiment is replaced by a light guide member and a light output from a light emitting element is output from an angle conversion member as a light in an unchanged wavelength range.

In addition, the specific description of the shapes, the numbers, the placements, the materials, etc. of the respective component elements of the light source device and the projector are not limited to those of the above described embodiment, but can be appropriately changed. In the above described embodiment, the example in which the light source device according to the present disclosure is mounted on the projector using the liquid crystal panel is shown, however, not limited to that. The light source device according to the present disclosure may be applied to a projector using a digital micromirror device as a light modulation device. Further, the projector does not necessarily have a plurality of light modulation devices, but may have only one light modulation device.

In the above described embodiment, the case where the wavelength conversion member 50 is pressed against to the supporting member 54 by the two pressing members 90 is explained, however, the number of the pressing members 90 is not limited to that. For example, when the amount of the excitation light E entering the wavelength conversion member 50 from the light emitting element 56 may be secured, three or more pressing members 90 may be provided.

Further, in the above described embodiment and modified examples, the pressing member molded by press working of the plate material having the uniform thickness into the desired shape is taken as an example, however, the pressing member may be formed, not by pressing of a plate material, but by bending of e.g., a linear member having a circular, oval, or polygonal sectional shape into predetermined shape.

Furthermore, in the above described embodiment and modified examples, the case where the other ends of the second extension portions in the pressing member are fixed to the supporting member via the fixing portions is taken as an example, however, the other ends of the second extension portions may be directly fixed to the fixing portions. Note that the method of fixing the other ends of the second extension portions to the fixing portions is not limited to the method using the screws, but may be e.g., a method of fitting the other ends in cutouts provided in the supporting member.

In the above described embodiment, the example in which the light source device of the present disclosure is applied to the projector is shown, however, not limited to that. The light source device of the present disclosure may be applied to an illumination device, a headlight of an automobile, or the like.

As below, the summary of the present disclosure will be appended.

Appendix 1

A light source device includes a light emitting element outputting a light, a light guide member entered by the light output from the light t emitting element, a supporting member supporting the light guide member in a groove portion, and a pressing member pressing the light guide member against the supporting member, wherein the light guide member has a first face and a second face located at sides opposite to each other on a first axis along a longitudinal side of the light guide member, a third face and a fourth face located at sides opposite to each other on a second axis crossing the first axis, and a fifth face and a sixth face located at sides opposite to each other on a third axis crossing the first axis and the second axis, the first face of the light guide member outputs a light guided through the light guide member, the light emitting element is provided to face the third face, the groove portion has a supporting surface facing the fourth face, and the pressing member has a first extension portion extending along the third axis and contacting the third face, a pair of second extension portions extending along the first axis and having one ends coupled to the first extension portion and the other ends fixed to the supporting member, and elastically deforms in a direction crossing a principal surface of the supporting surface to urge the third face.

According to the light source device having the above described configuration, the first extension portion and the second extension portions are provided, and thereby, the light guide member may be pressed against the supporting member by the downsized pressing member having a secured larger spring length. The pressing member has a property providing a gradual relationship between a spring load and displacement and, even when the displacement varies due to an influence of a tolerance, a change of the spring load is smaller and a desired spring load may be stably obtained. Accordingly, the light guide member may be accurately placed in a stable pressed condition in the groove portion.

Therefore, heat of the light guide member is transmitted to the supporting member side and a temperature rise of the light guide member is suppressed, and thereby, an output light having desired intensity may be obtained. Further, the pressing force of the light guide member becoming larger than a predetermined value and an excessive large load on the light guide member may be prevented. Furthermore, a defect including deterioration of e.g., an adhesive weak against heat placed around by the heat of the light guide member at a high temperature may be prevented.

Appendix 2

In the light source device according to Appendix 1, the pressing member includes a pair of first coupling portions respectively coupling the first extension portion and the one ends of the pair of second extension portions and curved in arc shapes.

According to the configuration, the first coupling portions coupling the first extension portion and the second extension portions are curved in the arc shapes, and thereby, stress concentration on the coupling parts between the first extension portion and the second extension portions may be relaxed. Therefore, the loads on the coupling parts between the first extension portion and the second extension portions when the pressing member elastically deforms are reduced, and thereby, durability and reliability of the pressing member may be increased.

Appendix 3

In the light source device according to Appendix 1 or Appendix 2, the pressing member includes a pair of fixing portions fixing the other ends of the pair of second extension portions to the supporting member, and the pair of fixing portions are located between the pair of second extension portions in a direction along the second axis.

According to the configuration, the pair of fixing portions are located inside of the pair of second extension portions in the direction along the second axis. Accordingly, compared to a case where the pair of fixing portions are located outside of the pair of second extension portions, upsizing of the dimension in the direction along the second axis in the pressing member may be suppressed.

Appendix 4

In the light source device according to Appendix 3, the pressing member includes a pair of second coupling portions respectively coupling the pair of fixing portions and the other ends of the pair of second extension portions and curved in arc shapes.

According to the configuration, the pair of second coupling portions are curved in the arc shapes, and thereby, stress concentration on the coupling parts between the second extension portions and the fixing portions may be relaxed. Therefore, the loads on the coupling parts between the second extension portions and the fixing portions when the pressing member elastically deforms are reduced, and thereby, durability and reliability of the pressing member may be increased.

Appendix 5

In the light source device according to any one of Appendix 1 to Appendix 4, a height of the third face of the light guide member supported by the groove portion along the second axis is higher than a height of a fixing surface fixing the other end of the second extension portion in the supporting member in a direction along the second axis.

According to the configuration, when the fixing portions of the pressing member placed so that the first extension portion is over the third face of the light guide member are fixed to the supporting member, with the first extension portion pushed up by the third face, the second extension portions elastically deform in the direction crossing the principal surface of the supporting surface. Therefore, the pressing member elastically deforms and functions as a leaf spring, and thereby, may urge the third face of the light guide member.

Appendix 6

In the light source device according to any one of Appendix 1 to Appendix 5, the groove portion further has a first wall surface facing the fifth face and separated from the fifth surface and a second wall surface facing the sixth face and separated from the sixth surface, the first wall surface has a first part located at the third face side and a second part located at the supporting surface side, the first part extends in a direction perpendicular to the supporting surface, and the second part inclines closer to the fifth face from the first part side toward the supporting surface side, the second wall surface has a third part located at the third face side and a fourth part located at the supporting surface side, the third part extends in a direction perpendicular to the supporting surface, and the fourth part inclines closer to the sixth face from the third part side toward the supporting surface side, and the first part, the second part, the third part, and the fourth part reflect at least part of the light output from the light emitting element.

According to the configuration, part of the light output from the light emitting element travels through the gap between the fifth face of the light guide member and the first part, and then, enters the second part inclining relative to the supporting surface. Here, the light is reflected by the second part and enters the fifth face of the light guide member. As described above, the light passing through the gap between the fifth face of the light guide member and the first wall surface easily enters the fifth face, and thereby, the amount of light reflected by the supporting surface and returning to the light emitting element side may be reduced. Further, part of the light is reflected by the first part extending perpendicularly relative to the supporting surface and enters the fifth face of the light guide member. Thereby, the light source device by which use efficiency of the light is higher and the light having desired intensity is easily obtained may be realized.

Appendix 7

In the light source device according to any one of Appendix 1 to Appendix 6, the pressing member is formed using a plate material having a uniform thickness, and thicknesses of the first extension portion and the second extension portions are smaller than a width in a direction orthogonal to an extension direction of the first extension portion and widths in a direction orthogonal to an extension direction of the second extension portions.

According to the configuration, when the pressing member elastically deforms, the deformation in the plate thickness direction may be made larger while the deformation in the width direction is suppressed in the first extension portion. Therefore, the first extension portion in contact with the third face of the light guide member can efficiently elastically deform in the plate thickness direction, and thereby, the third face of the light guide member may be efficiently pressed.

Appendix 8

In the light source device according to Appendix 7, the second extension portion has a shape in which the one end side is bent toward the principal surface of the supporting surface in a sectional view along a virtual plane along a plane containing the first axis and the third axis.

According to the configuration, the surface of the first extension portion facing the light guide member is in surface contact with the third face. Therefore, the pressing member may stably press the third face without damaging the third face of the light guide member.

Appendix 9

In the light source device according to any one of Appendix 1 to Appendix 8, a holding groove holding the pressing member is provided in the supporting member.

According to the configuration, the holding groove also functions as a guide for attachment of the pressing member to the supporting member, and thereby, the assembling work of the pressing member to the supporting member is easier.

Appendix 10

In the light source device according to any one of Appendix 1 to Appendix 9, a plurality of the pressing members are provided, and a total load of the plurality of pressing members pressing the light guide member is from 1 N to 10 N.

Here, when the total load is smaller than 1 N, the pressing force is insufficient and the light guide member may be moved and displaced in the groove portion due to an external force such as an impact. Further, an air layer is produced between the fourth face of the light guide member and the supporting surface of the groove portion and heat dissipation of the light guide member becomes lower, and light emission efficiency may be lower.

On the other hand, when the total load is larger than 10 N, the gap between the fourth face of the light guide member and the supporting surface of the groove portion becomes too small and the air layer does not substantially exist between the fourth face and the supporting surface. When the air layer does not substantially exist between the fourth face of the light guide member and the supporting surface, the light is not totally reflected by the interface between the fourth face and the air layer, and the light may leak from the fourth face of the light guide member to the supporting surface and extraction efficiency of the light may be lower. Further, the load becomes too large, and the light may leak out from a crack produced by breakage of the light guide member.

Therefore, when the total load is larger than 10 N, the extraction efficiency of the light in the light guide member may be lower.

According to the configuration, the total load for pressing the light guide member by the pair of pressing members is set to not less than 1 N and not more than 10 N, and thereby, the light guide member may be stably held in the groove portion in the adequate pressed condition.

Appendix 11

In the light source device according to any one of Appendix 1 to Appendix 10, the light emitting element outputs a first light having a first wavelength range, and the light guide member is a wavelength conversion member containing a phosphor, converting the first light output from the light emitting element into a second light having a second wavelength range from different the first wavelength range, and outputting the second light.

According to the configuration, the light source device by which the use efficiency of the first light is higher and the second light having the desired intensity is obtained may be realized.

Appendix 12

A projector includes the light source device according to any one of Appendix 1 to Appendix 11, a light modulation device modulating a light output from the light source device according to image information, and a projection optical device projecting the light modulated by the light modulation device.

According to the projector having the above described configuration, the light source device is provided, and thereby, the projector with higher light use efficiency may be provided.

What is claimed is:

1. A light source device comprising:
a light emitting element outputting a light;
a light guide member entered by the light output from the light emitting element;
a supporting member supporting the light guide member in a groove portion; and
a pressing member pressing the light guide member against the supporting member, wherein
the light guide member has a first face and a second face located at sides opposite to each other on a first axis of the light guide member, a third face and a fourth face located at sides opposite to each other on a second axis crossing the first axis, and a fifth face and a sixth face located at sides opposite to each other on a third axis crossing the first axis and the second axis,
the first face of the light guide member outputs a light guided through the light guide member,
the light emitting element is provided to face the third face,
the groove portion has a supporting surface facing the fourth face, and
the pressing member has a first extension portion extending in a direction closer to a direction along the third axis than a direction along the first axis, and contacting the third face, a pair of second extension portions extending in a direction closer to a direction along the first axis than a direction along the third axis, and having one ends coupled to the first extension portion and the other ends fixed to the supporting member, and elastically deforms in a direction crossing a principal surface of the supporting surface to urge the third face.

2. The light source device according to claim 1, wherein the pressing member includes a pair of first coupling portions respectively coupling the first extension portion and the one ends of the pair of second extension portions and curved in arc shapes.

3. The light source device according to claim 1, wherein the pressing member includes a pair of fixing portions fixing the other ends of the pair of second extension portions to the supporting member, and the pair of fixing portions are located between the pair of second extension portions in a direction along the second axis.

4. The light source device according to claim 3, wherein the pressing member includes a pair of second coupling portions respectively coupling the pair of fixing portions and the other ends of the pair of second extension portions and curved in arc shapes.

5. The light source device according to claim 1, wherein a height of the third face of the light guide member supported by the groove portion in a direction along the second axis is higher than a height of a fixing surface fixing the other end of the second extension portion in the supporting member in the direction along the second axis.

6. The light source device according to claim 1, wherein the groove portion further has a first wall surface facing the fifth face and separated from the fifth surface and a second wall surface facing the sixth face and separated from the sixth surface, the first wall surface has a first part located at the third face side and a second part located at the supporting surface side, the first part extends in a direction perpendicular to the supporting surface, and the second part inclines closer to the fifth face from the first part side toward the supporting surface side, the second wall surface has a third part located at the third face side and a fourth part located at the supporting surface side, the third part extends in a direction perpendicular to the supporting surface, and the fourth part inclines closer to the sixth face from the third part side toward the supporting surface side, and the first part, the second part, the third part, and the fourth part reflect at least part of the light output from the light emitting element.

7. The light source device according to claim 1, wherein the pressing member is formed using a plate material having a uniform thickness, and thicknesses of the first extension portion and the second extension portions are smaller than a width in a direction orthogonal to an extension direction of the first extension portion and widths in a direction orthogonal to an extension direction of the second extension portions.

8. The light source device according to claim 7, wherein the second extension portion has a shape in which the one end side is bent toward the principal surface of the supporting surface in a sectional view along a virtual plane along a plane containing the first axis and the third axis.

9. The light source device according to claim 1, wherein a holding groove holding the pressing member is provided in the supporting member.

10. The light source device according to claim 1, wherein a plurality of the pressing members are provided, and a total load of the plurality of pressing members pressing the light guide member is from 1 N to 10 N.

11. The light source device according to claim 1, wherein the light emitting element outputs a first light having a first wavelength range, and the light guide member is a wavelength conversion member containing a phosphor, converting the first light output from the light emitting element into a second light having a second wavelength range different from the first wavelength range, and outputting the second light.

12. A projector comprising:

the light source device according to claim 1;

a light modulation device modulating a light output from the light source device according to image information; and a projection optical device projecting the light modulated by the light modulation device.

* * * * *